United States Patent
Sasai et al.

(10) Patent No.: US 10,158,875 B2
(45) Date of Patent: *Dec. 18, 2018

(54) MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

(71) Applicant: Sun Patent Trust, New York, NY (US)

(72) Inventors: Hisao Sasai, Osaka (JP); Takahiro Nishi, Nara (JP); Youji Shibahara, Tokyo (JP); Toshiyasu Sugio, Osaka (JP); Kyoko Tanikawa, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,624

(22) Filed: Apr. 7, 2017

(65) Prior Publication Data
US 2017/0214931 A1   Jul. 27, 2017

Related U.S. Application Data

(60) Continuation of application No. 14/456,152, filed on Aug. 11, 2014, now Pat. No. 9,706,207, which is a
(Continued)

(51) Int. Cl.
*H04N 19/13* (2014.01)
*H04N 19/50* (2014.01)
(Continued)

(52) U.S. Cl.
CPC .............. *H04N 19/50* (2014.11); *H04N 19/13* (2014.11); *H04N 19/157* (2014.11);
(Continued)

(58) Field of Classification Search
CPC ....................................................... H04N 19/13
(Continued)

(56) References Cited

U.S. PATENT DOCUMENTS

| 7,190,289 B2 | 3/2007 | Kobayashi et al. |
| 7,298,303 B2 | 11/2007 | Kobayashi et al. |

(Continued)

FOREIGN PATENT DOCUMENTS

| JP | 5937020 | 5/2016 |
| TW | I232682 | 5/2005 |

(Continued)

OTHER PUBLICATIONS

Recommendation ITU-T H.265, Apr. 2013, p. 183.
(Continued)

*Primary Examiner* — Jeremiah C Hallenbeck-Huber
(74) *Attorney, Agent, or Firm* — Wenderoth, Lind & Ponack, L.L.P.

(57) ABSTRACT

A moving picture coding method includes (i) transforming, for each of one or more second processing units included in the first processing unit, a moving picture signal in a spatial domain into a frequency domain coefficient and quantizing the frequency domain coefficient, and (ii) performing arithmetic coding on a luminance CBF flag indicating whether or not a quantized coefficient is included in the second processing unit in which transform and quantization are performed, wherein, in the arithmetic coding, a probability table for use in arithmetic coding is determined according to whether or not the size of the first processing unit is identical to the size of the second processing unit and whether or not the second processing unit has a predetermined maximum size.

1 Claim, 35 Drawing Sheets

Related U.S. Application Data continuation of application No. 13/917,011, filed on Jun. 13, 2013, now Pat. No. 8,837,588, which is a division of application No. 13/556,583, filed on Jul. 24, 2012, now Pat. No. 8,798,147.

(60) Provisional application No. 61/513,141, filed on Jul. 29, 2011.

(51) Int. Cl.
*H04N 19/176* (2014.01)
*H04N 19/70* (2014.01)
*H04N 19/61* (2014.01)
*H04N 19/91* (2014.01)
*H04N 19/196* (2014.01)
*H04N 19/157* (2014.01)
*H04N 19/436* (2014.01)
*H04N 19/85* (2014.01)

(52) U.S. Cl.
CPC ......... *H04N 19/176* (2014.11); *H04N 19/196* (2014.11); *H04N 19/436* (2014.11); *H04N 19/61* (2014.11); *H04N 19/70* (2014.11); *H04N 19/85* (2014.11); *H04N 19/91* (2014.11)

(58) Field of Classification Search
USPC .................................................. 375/240.12
See application file for complete search history.

(56) References Cited

U.S. PATENT DOCUMENTS

| | | | |
|---|---|---|---|
| 7,372,905 B2 | 5/2008 | Foo et al. | |
| 7,978,225 B2 | 7/2011 | Tabuchi et al. | |
| 2004/0179620 A1 | 9/2004 | Foo et al. | |
| 2004/0234144 A1 | 11/2004 | Sugimoto et al. | |
| 2005/0146451 A1 | 7/2005 | Kobayashi et al. | |
| 2005/0175106 A1 | 8/2005 | Bidnur et al. | |
| 2006/0182436 A1 | 8/2006 | Tabuchi et al. | |
| 2006/0202872 A1 | 9/2006 | Kobayashi et al. | |
| 2006/0233260 A1 | 10/2006 | Watanabe | |
| 2007/0098069 A1 | 5/2007 | Gordon | |
| 2007/0285286 A1* | 12/2007 | Hussain | H03M 7/4006 341/50 |
| 2011/0135000 A1 | 6/2011 | Alshina | |
| 2011/0249721 A1* | 10/2011 | Karczewicz | H04N 19/159 375/240.02 |
| 2012/0169519 A1 | 7/2012 | Ugur et al. | |
| 2012/0230423 A1* | 9/2012 | Esenlik | H04N 19/0089 375/240.24 |
| 2013/0028319 A1 | 1/2013 | Sasai et al. | |
| 2013/0272399 A1 | 10/2013 | Sasai et al. | |
| 2014/0348229 A1 | 11/2014 | Sasai et al. | |
| 2014/0348230 A1 | 11/2014 | Sasai et al. | |
| 2017/0214931 A1 | 7/2017 | Sasai et al. | |

FOREIGN PATENT DOCUMENTS

| | | |
|---|---|---|
| TW | I317107 | 11/2009 |
| TW | I320286 | 2/2010 |
| WO | 2013/018296 | 2/2013 |

OTHER PUBLICATIONS

Official Communication dated Apr. 7, 2017 in European Patent Application No. 12820467.4.
H. Sasai: "Modified Context Derivation for neighboring dependency reduction", Jul. 21, 2011 (Jul. 21, 2011), Retrieved from the Internet: URL: http://phenix.it-sudparis.eu/jct/doc_end_user/documents/6_Torino/wg11/JCTVC-F429-v3.zip (see file WD_change_for_cbf_luma_left_only.doc) [retrieved on Feb. 16, 2017].
Office Action dated Feb. 20, 2014 in U.S. Appl. No. 13/556,583.
Extended European Search Report dated Apr. 25, 2014 in corresponding European Application No. 12820467.4.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d6, 6th Meeting, Torino, IT, Jul. 14-22, 2011.
Office Action dated Oct. 4, 2013 in U.S. Appl. No. 13/556,583.
Written Opinion of the International Searching Authority dated Oct. 16, 2012 in International Application No. PCT/JP2012/004538.
"Advanced Video Coding for Generic Audiovisual Services", ITU-T Recommendation H. 264, Mar. 2010.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, $5^{th}$ Meeting: Geneva, CH, Mar. 16-23, 2011.
Wei-Jung Chien, et al., "Memory and Parsing Friendly CABAC Context", Joint Collaborative Team on Video Coding (JCT-VC) of ITU-T SG16 WP3 and ISO/IEC JTC1/SC29/WG11, JCTVC-F606, $6^{th}$ Meeting: Torino, IT, Jul. 14-22, 2011.
Jianle Chen, et al., "Simplified context model selection for block level syntax coding", Joint Collaborative Team on Video Coding (JCT-VC) of ITU-T SG16 WP3 and ISO/IEC JTC1/SC29/WG11, JCTVC-F497, $6^{th}$ Meeting: Torino, IT, Jul. 14-22, 2011.
Hisao Sasai, et al., "Modified Context Derivation for Complexity reduction", Joint Collaborative Team on Video Coding (JCT-VC) of ITU-T SG16 WP3 and ISO/IEC JTC1/SC29/WG11, JCTVC-F429, $6^{th}$ Meeting: Torino, IT, Jul. 14-22, 2011.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver.8, 5th Meeting: Geneva, CH, Mar. 16-23, 2011.
Office Action dated Oct. 13, 2015 in Taiwanese patent application No. 101126608, with English translation of search report.
Wei-Jung Chien, "Memory and Parsing Friendly CABAC Context", Joint Collaborative Team on Video Coding (JCT-VC) of ITU-T SG16 WP3 and ISO/IEC JTC1/SC29/WG11, Document: JCTVC-F606_r1, 6th Meeting: Torino, IT, Jul. 14-22, 2011.
Patent Examination Report No. 2 dated Jun. 8, 2016 in Australian Patent Application No. 2013200650.
Office Action dated Sep. 12, 2016 in European Patent Application No. 12820467.4.

* cited by examiner

FIG. 5A

Table 1000 Association of ctxIdx and syntax elements for each slice type in the initialisation process

| Syntax element | | ctxIdxTable | Slice Type | | |
|---|---|---|---|---|---|
| | | | I | P | B |
| transform_tree() | cbf_luma | Table 0001 | 0..1 | 2..3 | 4..5 |

FIG. 5B

Table 1001 Values of variable m and n for cbf_luma ctxIdx

| Initialisation variables | cbf_luma ctxIdx | | | | | |
|---|---|---|---|---|---|---|
| | 0 | 1 | 2 | 3 | 4 | 5 |
| m | -22 | -5 | -18 | -41 | -11 | -32 |
| n | 116 | 75 | 98 | 120 | 80 | 83 |

FIG. 5C

Table 1002 Syntax elements and associated types of binarization, maxBinIdxCtx, ctxIdxTable, and ctxIdxOffset

| Syntax element | | Type of binarization | maxBinIdx Ctx | ctxIdxTable | ctxIdxOffset |
|---|---|---|---|---|---|
| cbf_luma | I | FL, cMax=1 | 0 | Table 0001 | 0 |
|  | P |  | 0 | Table 0001 | 2 |
|  | B |  | 0 | Table 0001 | 4 |

FIG. 5D

Table 1003 Assignment of ctxIdxInc to binIdx for all ctxIdxTable and ctxIdxOffset values

| Syntax element | ctxIdxTable, ctxIdxOffset | binIdx | | | | |
|---|---|---|---|---|---|---|
|  |  | 0 | 1 | 2 | 3 | >=4 |
| cbf_luma | Table 0001 | 0 | 0,1 (subclause XXX) | na | na | na | na |
|  | 2 | 0,1 (subclause XXX) | na | na | na | na |
|  | 4 | 0,1 (subclause XXX) | na | na | na | na |

FIG. 6

601 xxx  Derivation process of ctxIdxInc for the syntax element luma_cbf
Input to this process is transformDepth, transformSize,
Output of this process is ctxIdxInc.
The variable ctxIdxInc is derived as follows.
-If transformDepth is equal to 0 or transformSize is MaxTrafoSize, the following applies.
  - ctxIdxInc is set equal to 0.
-Otherwise, the following applies.
  - ctxIdxInc is set equal to 1.

FIG. 15

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 26

| Corresponding standard | Driving frequency |
|---|---|
| MPEG-4 AVC | 500 MHz |
| MPEG-2 | 350 MHz |
| ⋮ | ⋮ |

FIG. 28A

Table 0000 Association of ctxIdx and syntax elements for each slice type in the initialisation process

| Syntax element | | ctxIdxTable | Slice Type | | |
|---|---|---|---|---|---|
| | | | I | P | B |
| transform_tree() | cbf_luma | Table 0001 | 0..3 | 4..7 | 8..11 |

FIG. 28B

Table 0001 Values of variable m and n for cbf_luma ctxIdx

| Initialisation variables | cbf_luma ctxIdx | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| m | -22 | -5 | -16 | -16 | -18 | -41 | -29 | -23 | -11 | -32 | -19 | -16 |
| n | 116 | 75 | 112 | 111 | 98 | 120 | 117 | 108 | 80 | 83 | 89 | 85 |

FIG. 28C

Table 0002 Syntax elements and associated types of binarization, maxBinIdxCtx, ctxIdxTable, and ctxIdxOffset

| Syntax element | | Type of binarization | maxBinIdx Ctx | ctxIdxTable | ctxIdxOffset |
|---|---|---|---|---|---|
| cbf_luma | I | FL, cMax=1 | 0 | Table 0001 | 0 |
| | P | | 0 | Table 0001 | 4 |
| | B | | 0 | Table 0001 | 8 |

FIG. 28D

Table 0003 Assignment of ctxIdxInc to binIdx for all ctxIdxTable and ctxIdxOffset values

| Syntax element | ctxIdxTable, ctxIdxOffset | | binIdx | | | | |
|---|---|---|---|---|---|---|---|
| | | 0 | 1 | 2 | 3 | >=4 |
| cbf_luma | Table 0001 | 0 | 0,1,2,3 (subclause 9.3.3.1.1.1) | na | na | na | na |
| | | 4 | 0,1,2,3 (subclause 9.3.3.1.1.1) | na | na | na | na |
| | | 8 | 0,1,2,3 (subclause 9.3.3.1.1.1) | na | na | na | na |

FIG. 29A

9.3.3.1.1 Assignment process of ctxIdxInc using neighbouring syntax elements

Subclause 9.3.3.1.1.1 specifies the derivation process of ctxIdxInc for the syntax elements alf_cu_flag, split_coding_unit_flag, skip_flag, merge_flag, intra_chroma_pred_mode, inter_pred_flag, ref_idx_lc, ref_idx_l0, ref_idx_l1, mvd_l0, mvd_l1, mvd_lc, no_residual_data_flag, cbf_cb and cbf_cr.

9.3.3.1.1.1 Derivation process of ctxIdxInc using left and above syntax elements

Input to this process is the luma location (xP, yP) specifying the top-left luma sample of the current prediction unit relative to the top-left sample of the current picture.

Output of this process is ctxIdxInc.

Let the luma location (xL, yL) specify a location covered by the prediction unit to the left of the top-left luma sample of the current prediction unit with xL = xP-MinPuSize and yL = yP, the variable availableL is derived as follows.

- If the prediction unit covering location (xL, yL) is available, availableL is set equal to 1.
- Otherwise (the prediction unit covering location (xL, yL) is not available), availableL is set equal to 0.

Let the luma location (xA, yA) specify a location covered by the prediction unit above the top-left luma sample of the current prediction unit with xA = xP and yA = yP-MinPuSize, the variable availableAL is derived as follows

- If the prediction unit covering location (xA, yA) is available, availableA is set equal to 1.
- Otherwise (the prediction unit covering location (xA, yA) is not available), availableA is set equal to 0

The assignment of ctxIdxInc for the syntax elements alf_cu_flag, split_coding_unit_flag, skip_flag, merge_flag, intra_chroma_pred_mode, inter_pred_flag, ref_idx_lc, ref_idx_l0, ref_idx_l1, mvd_l0, mvd_l1, mvd_lc, no_residual_data_flag, cbf_luma, cbf_cb and cbf_cr is specified in Table 9-50.

FIG. 29B

Table 9-50- Specifcation of ctxIdxInc using left and above syntax elements

| Syntax element | condL | condA | ctxIdxInc |
|---|---|---|---|
| cbf_luma | cbf_luma[xL][yL] | cbf_luma[xA][yA] | (condL && availableL)+ (condA && availableA) <<1 |

MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

TECHNICAL FIELD

One or more exemplary embodiments disclosed herein relate generally to a moving picture coding method and a moving picture coding apparatus which code a flag which indicates whether or not there is a transform coefficient of a coding target block such that an image is coded for each of the blocks, and a moving picture decoding method, a moving picture decoding apparatus, and a moving picture coding and decoding apparatus which decode a flag which indicates whether or not there is a coded transform coefficient.

BACKGROUND ART

In recent years, there have been an increasing number of applications for video-on-demand type services, for example, including video conferences, digital video broadcasting, and streaming of video content via the Internet, and these applications depend on transmission of video information. At the time of transmission or recording of video data, a considerable amount of data is transmitted through a conventional transmission path of a limited bandwidth or is stored in a conventional recording medium with limited data capacity. In order to transmit video information through a conventional transmission channel and store video information in a conventional recording medium, it is essential to compress or reduce the amount, of digital data.

Thus, a plurality of video coding standards have been developed for compressing video data. Such video coding standards include, for example, International Telecommunication Union Telecommunication Standardization Sector (ITU-T) standards denoted as H.26x, and the ISO/IEC standards denoted as MPEG-x. The most up-to-date and advanced video coding standard is currently the standard denoted as H.264/AVC or MPEG-4/AVC (refer to Non Patent Literature 1).

The coding approach which serves as a basis for these standards is based on prediction coding including major steps to be shown the following (a) to (d). a) In order to perform data compression on a block level for each of the video frames, the video frame is divided into blocks of pixel. (b) By predicting each, of the blocks from the already coded video data, temporal and spatial redundancy is specified. (c) By subtracting the prediction data from the video data, the specified redundancy is eliminated. (d) By Fourier transform, quantization, and entropy coding, the remaining data (residual blocks) are compressed.

CITATION LIST

Non Patent Literature

[NPL 1]
ITU-T Recommendation H.264 "Advanced video coding for generic audiovisual services," March 2010
[NPL 2]
JCT-VC "WD3: Working Draft 3 of High-Efficiency Video Coding," JCTVC-E603, March 2011

SUMMARY OF INVENTION

Technical Problem

Recently, there has been a growing need for a further increase in coding efficiency against the backdrop of progress in high-definition moving pictures.

Therefore, the present disclosure has an object to provide a moving picture coding method, a moving picture coding apparatus, a moving picture decoding method, a moving picture decoding apparatus, and a moving picture coding and decoding apparatus which have high coding efficiency.

Solution to Problem

A moving picture coding method according to one non-limiting and exemplary embodiment is a method for coding a moving picture signal for each of the first processing units. More specifically, the moving picture coding method comprising: transforming, for each of one or more second processing units included in the first processing unit, the moving picture signal in a spatial domain into a frequency domain coefficient and quantizing the frequency domain coefficient; and performing arithmetic coding on a luminance CBF flag indicating whether or not a quantized coefficient is included in each of the second processing units for which the transform and the quantization are performed. In the performing of arithmetic coding, a probability table for use in the arithmetic coding is determined according to whether or not a size of the first processing unit is identical to a size of the second processing unit and whether or not the second processing unit has a predetermined maximum size.

It should be noted that the present disclosure can be realized or implemented not only as coding methods and decoding methods, but also programs for causing computers to execute each of the steps included in the coding methods and decoding methods. Naturally, the programs can be distributed through a non-transitory recording medium such as Compact Disc-Read Only Memories (CD-ROMs) and communication networks such as the Internet.

Advantageous Effects of Invention

The present disclosure makes it possible to efficiently perform arithmetic coding and arithmetic decoding on a luminance CBF flag.

BRIEF DESCRIPTION OF DRAWINGS

These and other objects, advantages and features of the disclosure will become apparent from the following description thereof taken in conjunction with the accompanying drawings that illustrate a specific embodiment of the present disclosure. In the Drawings:

FIG. 5A is Table 1000 for use in arithmetic decoding according to the present embodiment and a table which corresponds to Table 0000 in FIG. 28A;

FIG. 5B is Table 1001 for use in arithmetic decoding according to the present embodiment and a table which corresponds to Table 0001 in FIG. 28B;

FIG. 5C is Table 1002 for use in arithmetic decoding according to the present embodiment and a table which corresponds to Table 0002 in FIG. 28C;

FIG. 5D is Table 1003 for use in arithmetic decoding according to the present embodiment and a table which corresponds to Table 0003 in FIG. 28D;

FIG. 6 is a diagram for explaining a method for obtaining ctxIdxInc which is a number for deriving a probability with respect to the luminance CBF flag according to Embodiment 1;

FIG. 15 is a diagram showing a structure of multiplex data;

FIG. 26 is a diagram showing an example of a look-up table in which video data standards are associated with driving frequencies;

FIG. 28A is a correspondence between slice type SliceType and a ctxIdx number which corresponds to a probability value necessary for arithmetic coding and arithmetic decoding;

FIG. 28B is a table for defining combinations of ctxIdx numbers 0 to 11 as illustrated in FIG. 28A and information (m, n) necessary for determining an initial probability;

FIG. 28C is a table which indicates allocation of an offset value ctsIdxOffset which defines that the foremost ctxIdx is changed according to a slice type;

FIG. 28D is a table how ctxIdx is allocated to binIdx which is a number indicating an order from the foremost of the binary signal sequence;

FIG. 29A is a diagram showing how to obtain ctxIdxInc which is a signal for deriving a ctxIdx number with respect to a flag including a luminance CBF flag in HEVC;

FIG. 29B is a table showing how to determine ctxIdxInc of the luminance CBF flag;

Figure 1:
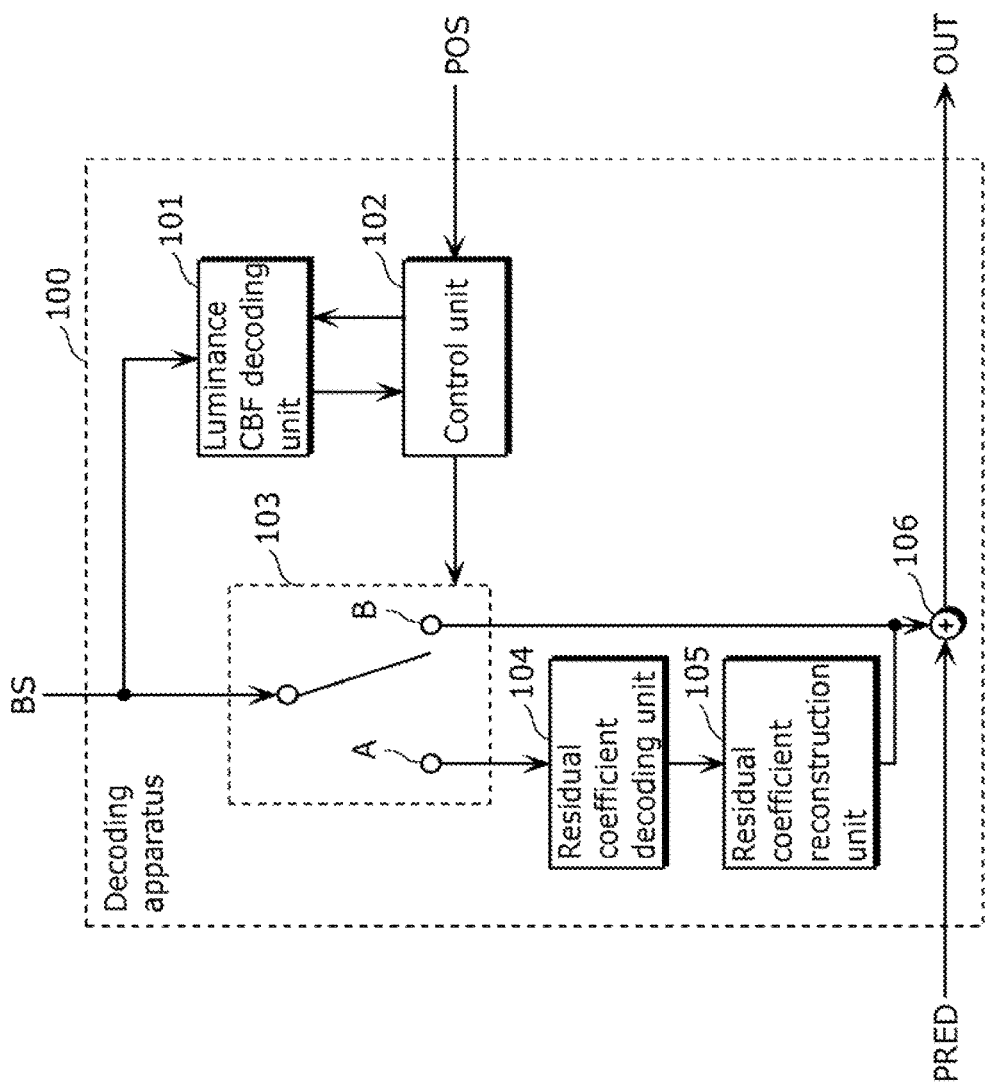
FIG. 1 is a block diagram showing a decoding apparatus including a luminance CBF flag decoding unit according to Embodiment 1.

DESCRIPTION OF EMBODIMENTS (Underlying Knowledge Forming Basis of the Present Disclosure)

In the above described process (d), the present video coding standards and the video coding standards under consideration further reduce an amount of information by coding a flag which indicates whether or not there is information in the residual block after Fourier transform and quantization. More specifically, the flag which indicates whether or not there is a coefficient in the residual block after quantization is variable length coded.

It should be noted that in a candidate standard called High Efficiency Video Coding (HEVC) in which progress is being made in work toward standardization (refer to Non Patent Literature 2), this identification flag is called coded block flag (CBF) and the identification flag corresponding to a luminance signal is called luminance CBF flag cbf_luma. In the variable length coding, Context Adaptive Binary Arithmetic Coding (CABAC) based on arithmetic coding to be described later is known, and in HEVC, coding is performed with parameters defined by a method shown in FIGS. 28A to 29B.

FIGS. 28A to 28D are an information group showing the definition of information for coding luminance CBF flag in HEVC. First, Table 0000 as illustrated in FIG. 28A shows correspondence between a type of slice (I/P/B) called SliceType, and a ctxIdx number corresponding to a probability value necessary for arithmetic coding and arithmetic decoding. This shows, for example, in the case of I slice, that ctxIdx numbers used for coding and decoding of the luminance CBF flag are four kinds, that is, 0 to 3. Similarly, this shows four kinds, that is, 4 to 7 in the case of P slice, and four kinds, that is, 8 to 11 in the case of B slice.

Next, Table 0001 shown in FIG. 28B is a table for defining a combination of ctxIdx numbers 0 to 11 shown in Table 0000 and information (m, n) necessary for determining an initial probability. It should be noted that regarding a technique for deriving the initial probability with the use of (m, n), a technique disclosed in Non Patent Literature 1 or Non Patent Literature 2 is used.

Next, Table 0002 shown in FIG. 28C is a table which shows an allocation of an offset value ctxIdxOffset which defines a change of the foremost ctxIdx according to the SliceType (in example, 0, 4 and 8).

Next, Table 0003 shown in FIG. 28D is a table which shows how to allocate ctxIdx with respect to binIdx which is a number showing an order from the foremost of the binary signal sequence because ctxIdx is allocated to every binary signal sequence (bin) when the arithmetic coding and decoding are actually performed. In other words, the first bit of the first binary signal sequence is determined as binIdx=0, and hereafter is defined as 1 and 2. It should be noted that since the luminance CBF flag is a flag indicating "0" or "1", it is defined only in the case of bixIdx=0. A method defined in subclause 9.3.3.1.1.1 shows that the ctxIdx number is used with one of 0, 1, 2, and 3 and is provided with an offset of 0, 4, and 8 according to SliceType. It should be noted that na in the table is a sign of not available.

Moreover, the content of the subclause 9.3.1.1.1 will be described in detail with reference to FIGS. 29A and 29B. B01 shown in FIG. 29A is an extracted portion from Non-Patent Literature 2 of a portion which shows a method for obtaining a signal ctxIdxInc for deriving the ctxIdx number with respect to a flag including the luminance CBF flag in HEVC.

First, 9.3.3.1.1 shows arithmetic coding is performed on a flag including the luminance CBF flag, based on results of neighboring blocks. Next, in a portion of 9.3.3.1.1.1, details about derivation of a block result located above the block including a flag of the coding target and a block result located in the left are described. It should be noted that in the luminance CBF flag, as illustrated in Table 9-50 shown in FIG. 29B, it is shown that ctxIdxInc is determined as follows by the luminance CBF flag in the left block and the luminance CBF flag in the above block.

First, in the case where the luminance CBF flag in the left block is 0 (or does not exist) and the luminance CBF flag in the above block is 0 (or does not exist), the ctxIdxInc number of the luminance CBF flag of the coding target is determined to be 0 (case 1). Moreover, in the case where the luminance CBF flag in the left block is 1 and the luminance CBF flag in the above block is 0 (or does not exist), the ctxIdxInc number of the luminance CBF flag of the coding target is determined to be 1 (case 2). Moreover, in the case where the luminance CBF flag in the left block is 0 (or does not exist) and the luminance CBF flag in the above block is 1, the ctxIdxInc number of the luminance CBF flag of the coding target is determined to be 2 (case 3). Moreover, in the case where the luminance CBF flag in the left block is 1 and the luminance CBF flag in the above block is 1, the ctxIdxInc number of the CBF flag of the coding target is determined to be 3 (case 4).

In this way, ctxIdxInc for deriving a probability value for use in arithmetic coding and arithmetic decoding of the luminance CBF flag of the coding target according to a value of the surrounding luminance CBF flag is switched.

Next, variable length coding of the identification flag (CBF) and the like will be described. In H.264, as one of the variable length coding methods, there is Context Adaptive Binary Arithmetic Coding (CABAC), CABAC will be described with reference to FIGS. 30 to 32.

Figure 30:
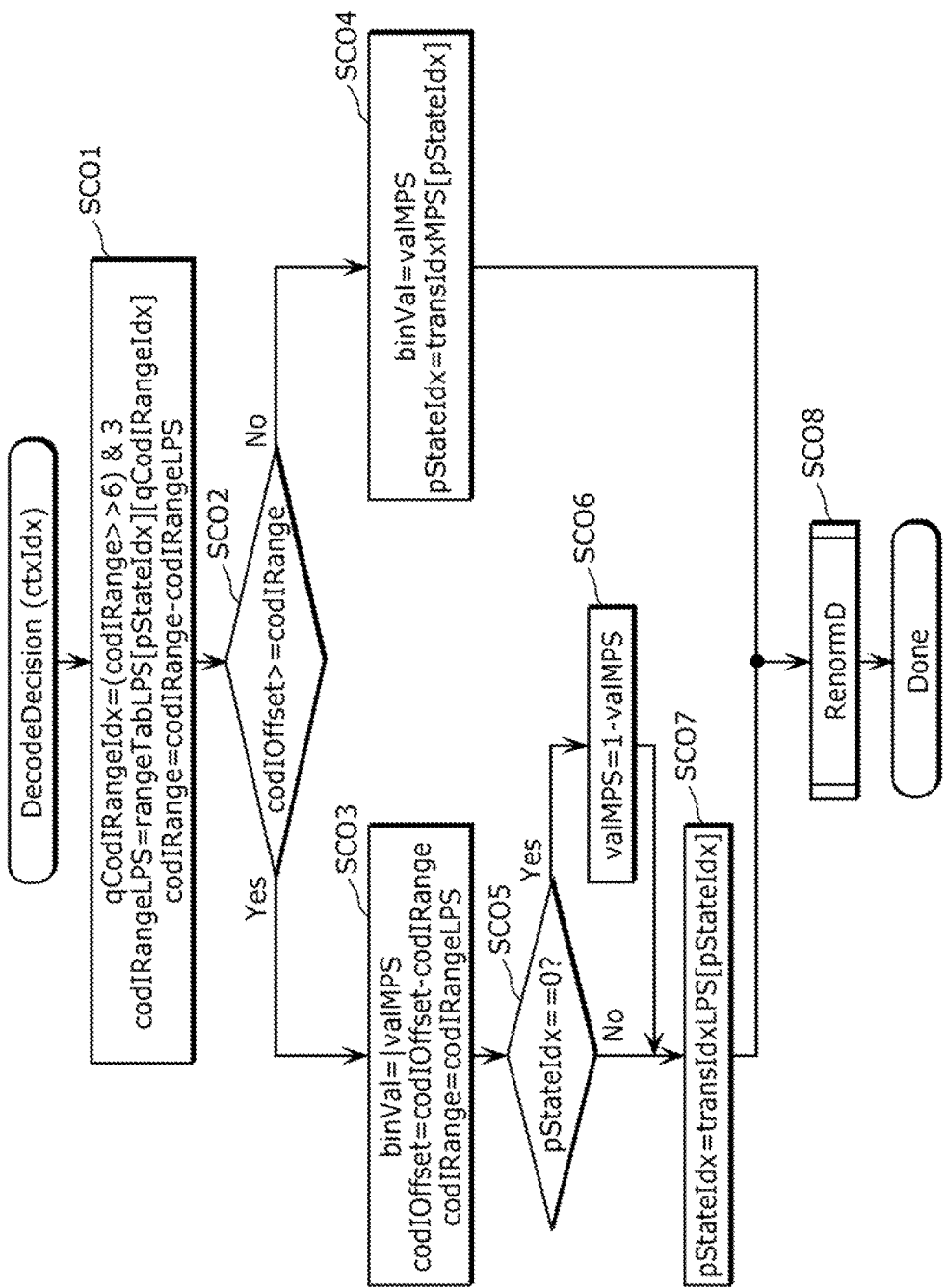
FIG. 30 is a chart showing a flow of the conventional context adaptive decoding processes.

FIG. 30 is a flowchart showing a flow of the above described conventional context adaptive arithmetic decoding processes. It should be noted that this diagram is extracted from Non Patent Literature 1 and is as described in Non Patent Literature 1 as long as there is no specific explanation.

In the arithmetic decoding processing, a context (ctxIdx) determined based on the signal type is input first.

This is followed by: the calculation of a value qCodIRangeIdx derived from a parameter codIRange showing a current internal state of the arithmetic decoding apparatus; the obtainment of a pStateIdx value that is a state value corresponding to ctxIdx; and the obtainment of codIRangeLPS with reference to a table (rangeTableLPS) based on these two values of qCodIRangeIdx and pStateIdx. Here, this codIRangeLPS denotes a value that is a parameter showing the internal state of the arithmetic decoding apparatus at the time of the occurrence of an LPS (this LPS specifies one of the symbols 0 and 1 that has the lower occurrence probability) with respect to a first parameter codIRange showing the internal state of the arithmetic decoding apparatus. In addition, a value obtained by subtracting the aforementioned codIRangeLPS from the current codIRange is included in codIRange (Step SC01).

Next, the calculated codIRange is compared with a second parameter codIOffset showing the internal state of the arithmetic decoding apparatus (Step SC02). When the codIOffset is greater than or equal to codIRange (YES in Step SC02), it is determined that the symbol of the LPS has occurred, and valMPS (an MPS value (0 or 1) specifying the one of the symbols 0 and 1 which has the higher occurrence probability, and the different value (0 when valMPM=1 is satisfied or 1 when valMPM=0 is satisfied) are set to binVal that is a decoding output value.

Moreover, a value obtained by subtracting codIRange is set to a second parameter codIOffset showing the internal state of the arithmetic decoding apparatus. Furthermore, a value of codIRangeLPS calculated in Step SC01 is set to the first parameter codIRange showing the internal state of the arithmetic decoding apparatus (Step SC03) because LPS has occurred.

It should be noted that in the case where pStateIdx value which is a state value corresponding to the ctxIdx is 0 (YES in Step SC05), it is shown that the probability of LPS is greater than the probability of MPS, and therefore valMPM is replaced (0 when valMPM=1 is satisfied or 1 when valMPM=0 is satisfied) (Step SC06). Meanwhile, in the case where the pStateIdx value is 0 (NO in Step SC05), the pStateIdx value is updated based on a transform table transIdxLPS in the case where the LPS occurs (Step SC07).

Furthermore, in the case where codIOffset is small (NO in SC02), it is determined that the symbol of the MPS has occurred, and valMPS is set to binVal that is a decoding output value, and the pStateIdx value is updated based on the transform table transIdxMPS in the case where the MPS has occurred (Step SC04).

Lastly, normalization (RenormD) (Step SC08) is performed to end the arithmetic decoding.

As deserted the above, in the context adaptive binary arithmetic coding, a plurality of symbol occurrence probabilities each of which is the occurrence probability of a binary symbol and corresponds to context index are stored and the symbol occurrence probabilities are switched according to a condition (for example, refer to the value of the adjacent block). Therefore, the order of processes needs to be maintained.

Figure 31:
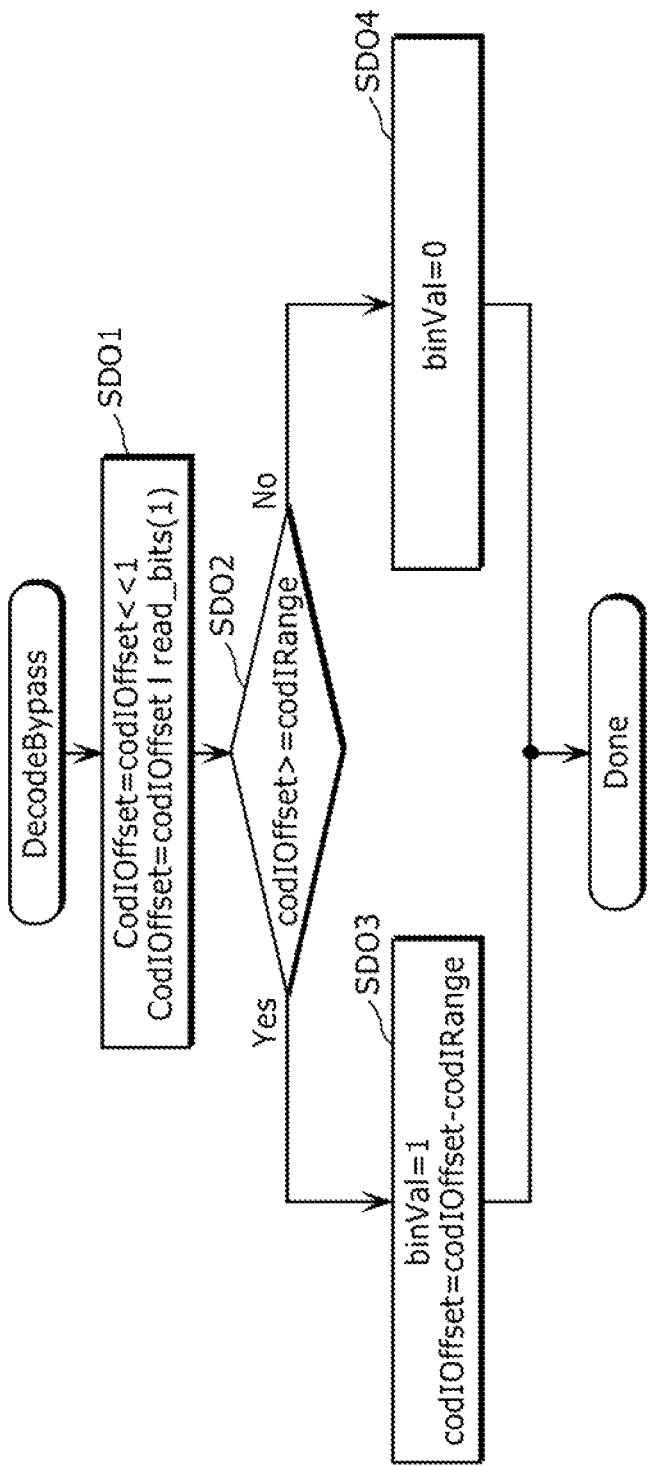
FIG. 31 is a chart showing a flow of the conventional bypass arithmetic decoding processes.

FIG. 31 is a flowchart showing a flow of the above-described conventional arithmetic decoding processes for bypass processing. It should be noted that this diagram is extracted from Non Patent Literature 1 and is as described in Non Patent Literature 1 as long as there is no specific explanation.

First, the second parameter codIOffset showing a current internal state of the arithmetic decoding apparatus is shifted to the left (doubled), and 1 bit is read out from the bit stream.

This (doubled) value is set when the read-out bit is 0, whereas a value obtained by adding 1 thereto is set when the read-out bit is 1 (SD01).

Next, in the case where codIOffset is greater than or equal to the first parameter codIRange showing the internal state of the arithmetic decoding apparatus (YES in SD02), "1" is set to binVal that is a decoding output value, and a value obtained through the subtraction of codIRange is set to codIOffset (Step SD03). Meanwhile, in the case where codIOffset is smaller than the first parameter codIRange showing the internal state of the arithmetic decoding apparatus (NO in SD02), "0" is set to binVal that is a decoding output value (Step SD04).

Figure 32:
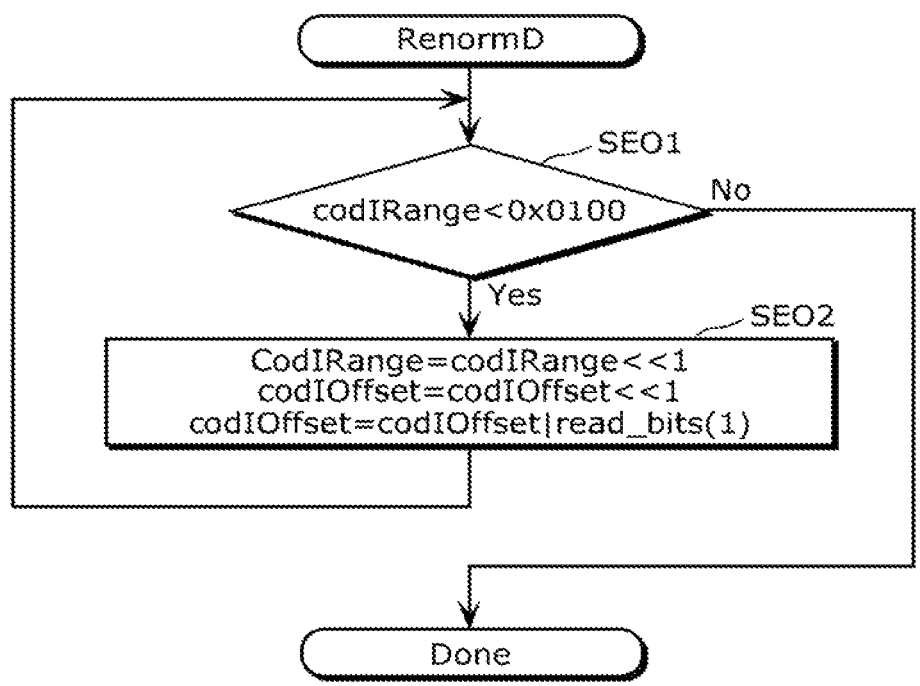
FIG. 32 is a flowchart for explaining in more detail normalization processing (RenormD) as illustrated in Step SC08 in FIG. 30.

FIG. 32 is a flowchart for explaining in detail the normalization processing (RenormD) shown in Step SC08 in FIG. 30. It should be noted that this diagram is extracted from Non Patent Literature 1 and is as described in Non Patent Literature 1 as long as there is no specific explanation.

When the first parameter codIRange showing the internal state of the arithmetic decoding apparatus in arithmetic decoding is smaller than 0×100 (in the hexadecimal notation that is 256 in the decimal system) (YES in Step SE01), codIRange is shifted to the left (doubled), the second parameter codIffset showing the internal state of the arithmetic decoding apparatus is shifted to the left (doubled), and 1 bit is read out from the bit stream. This (doubled) value is set when the read-out bit is 0, whereas a value obtained by adding 1 thereto is set when the read-out bit is 1 (SE02). This processing is completed when codIRange reaches or exceeds 256 at last (NO in Step SE01.

Arithmetic decoding is performed by performing the above processes.

However, the conventional technique requires that the probability value is varied according to the results of the above and left blocks that are neighboring with each other for arithmetic coding and arithmetic decoding of the luminance CBF flag. Against this backdrop, the results of neighboring blocks in the left and above portions for coding or decoding should be recorded for arithmetic coding and arithmetic decoding. Because of this, in the case where resolution of an input video is large, a voluminous memory must be prepared for storing the results.

In order to solve the above described problem, a moving picture coding method according to one non-limiting and exemplary embodiment is a method for decoding a moving picture signal for each of the first processing units. More specifically, the moving picture coding method comprising: transforming, for each of one or more second processing units included in the first processing unit, the moving picture signal in a spatial domain into a frequency domain coefficient and quantizing the frequency domain coefficient; and performing arithmetic coding on a luminance CBF flag indicating whether or not a quantized coefficient is included in each of the second processing units for which the transform and the quantization are performed. In the performing of arithmetic coding, a probability table for use in the arithmetic coding is determined according to whether or not a size of the first processing unit is identical to a size of the second processing unit and whether or not the second processing unit has a predetermined maximum size.

With this configuration, since a probability value for performing arithmetic coding of the luminance CBF flag can be determined without depending on the value of the luminance CBF flag for each of the surrounding blocks, a high coding efficiency can be maintained even if a memory capacity for holding the luminance CBF flag is significantly decreased.

Furthermore, in the performing of arithmetic coding, a probability table for use in the arithmetic coding is further determined according to a type of a slice to which the first processing unit belongs.

For example, the first processing unit may be a coding unit, moreover, the second processing unit may be a transform unit.

Moreover, switching may be performed between coding conforming to a first standard and coding conforming to a second standard and the transform and quantization and the arithmetic coding are performed as the coding conforming to the first standard, and the moving picture coding method may further comprise coding an identifier indicating a coding standard.

A moving picture decoding method according to one non-limiting and exemplary embodiment is a method for decoding a coded moving picture signal for each of the first processing units. More specifically, the moving picture decoding method includes: performing arithmetic decoding on a luminance CBF flag indicating whether or not a quantized coefficient is included in one or more second processing units included in the first processing unit; and reconstructing the moving picture signal using the quantized coefficient of the second processing unit when the luminance CBF flag indicates that the quantized coefficient is included in each of the second processing units, the luminance CBF flag being decoded in the arithmetic decoding. In the performing of arithmetic decoding, a probability table for use in the arithmetic decoding is determined according to whether or not a size of the first processing unit is identical to a size of the second processing unit and whether or not the second processing unit has a predetermined maximum size.

In the performing of arithmetic decoding, a probability table for use in the arithmetic decoding is further determined according to a type of a slice to which the first processing unit belongs.

For example, the first processing unit may be a coding unit. Moreover, the second processing unit may be a transform unit.

Moreover, switching may be performed between decoding conforming to a first standard and decoding conforming to a second standard according to an identifier which is included in a coded signal and indicates the first standard or the second standard, and the arithmetic decoding and the reconstructing may be performed as the decoding conforming to the first standard when the identifier indicates the first standard.

A moving picture coding apparatus according to one non-limiting and exemplary embodiment codes a moving picture signal for each of the first processing units. More specifically, the moving picture coding apparatus comprising: a transform and quantization unit configured to transform, for each of one or more second processing units included in the first processing unit, the moving picture signal in a spatial domain into a frequency domain coefficient and to quantize the frequency domain coefficient; and an arithmetic coding unit configured to perform arithmetic coding on a luminance CBF flag indicating whether or not a quantized coefficient is included in the second processing unit processed by the transform and quantization unit. The arithmetic coding unit is configured to determine a probability table for use in the arithmetic coding according to whether or not a size of the first processing unit is identical to a size of the second processing unit and whether or not the second processing unit has a predetermined maximum size.

A moving picture decoding apparatus according to one non-limiting and exemplary embodiment decodes a coded moving picture signal for each of the first processing units. More specifically, the moving picture decoding apparatus comprising: an arithmetic decoding unit configured to perform arithmetic decoding on a luminance CBF flag indicating whether or not a quantized coefficient is included in one or more second processing units included in the first processing unit; and a reconstruction unit configured to reconstruct a moving picture signal using the quantized coefficient of the second processing unit when the luminance CBF flag indicates that the quantized coefficient is included in the second processing unit, the luminance CBF flag being processed by the arithmetic decoding unit. The arithmetic decoding unit is configured to determine a probability table for use in the arithmetic decoding according to whether or not a size of the first processing unit is identical to a size of the second processing unit and whether or not the second processing unit has a predetermined maximum size.

A moving picture coding and decoding apparatus according to one non-limiting and exemplary embodiment includes the moving picture coding apparatus and the moving picture decoding apparatus that are described above.

It should be noted that general or specific embodiments may be implemented not only as a system, a method, an integrated circuit, a computer program, or a recording medium, but also as an optional combination of a system, a method, an integrated circuit, a computer program, and a recording medium.

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. The present disclosure is defined by the scope of claims. Therefore, among the structural elements in the following exemplary embodiments, structural elements not recited in any one of the independent claims defining the most generic part of the inventive concept are described as arbitrary structural elements.

Embodiment 1

A moving picture decoding apparatus according to Embodiment 1 decodes a coded moving picture signal for each of the first processing units. Therefore, the moving picture decoding apparatus includes: an arithmetic decoding unit which performs arithmetic decoding on a luminance CBF flag indicating whether or not a quantized coefficient is included in each of one or more second processing units included in the first processing unit; and a reconstruction unit which reconstructs a moving picture signal using a quantized coefficient of the second processing unit when the luminance CBF flag decoded in the arithmetic decoding unit shows that the quantized coefficient is included in the second processing unit.

The arithmetic decoding unit determines a probability table for use in arithmetic decoding according to whether or not a size of the first processing unit is identical to a size of the second processing unit and whether or not the second processing unit has a predetermined maximum size. Furthermore, the arithmetic decoding unit may determine a probability table according to a slice type to which the first processing unit belongs (I slice/P slice/B slice). It should be noted that "determining a probability table" can be paraphrased as "switching a context", for example.

A moving picture input into the moving picture decoding apparatus is composed of a plurality of pictures. Moreover, each of the pictures is divided into a plurality of slices. Then the slice is coded or decoded according to each of the processing units. The processing unit includes a coding unit (CU), a prediction unit (PU), and a transform unit (TU). CU is a block of maximum 128×128 pixels and is a unit which corresponds to a conventional macroblock. PU is a fundamental unit for inter prediction. TU is a fundamental unit for orthogonal transform, and the size of TU is as small as or smaller than the size of CU. Hereafter, the coding unit is described as a coded block and the transform unit is described as a transform block.

The first processing unit according to the present embodiment is, for example, a coded block (CU). Moreover, the second processing unit according to the present embodiment is, for example, a transform block (TU). There is a luminance CBF flag in each of the transform blocks and the luminance CBF flag indicates whether or not there is a quantized coefficient in the transform block. It should be noted that "whether or not there is a quantized coefficient in the transform block" can be paraphrased as whether or not there is a quantized coefficient to be coded. Furthermore, it can be paraphrased as whether or not there is a non-zero coefficient in the transform block.

FIG. 1 is a block diagram showing a functional configuration of a decoding apparatus including a luminance CBF flag decoding unit according to Embodiment 1 of the present disclosure.

A decoding apparatus 100 according to the present embodiment, as shown in FIG. 1, includes a luminance CBF decoding unit 101, a control unit 102, a switch 103, a residual coefficient decoding unit 104, and a residual signal reconstruction unit 105, and an addition unit 106. The decoding apparatus 100 reconstructs the luminance CBF flag from a decoding position information POS and an obtained bit stream BS, and outputs a decoded image signal OUT from an image prediction signal PRED.

Figure 2:
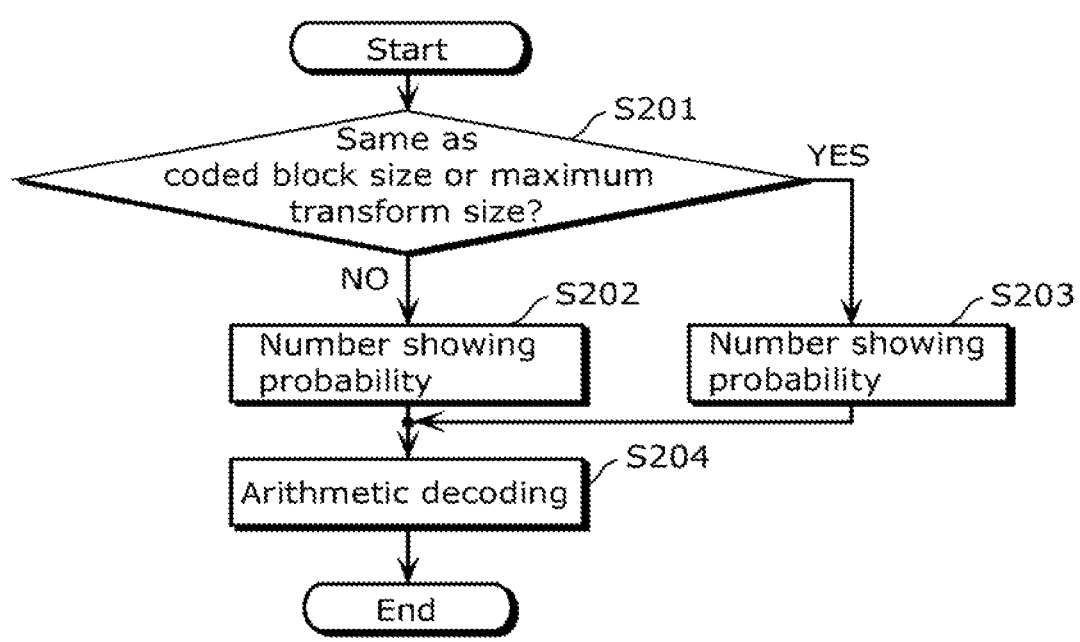
FIG. 2 is a flowchart showing a flow of operations of a luminance CBF decoding unit 101 according to the present disclosure.

An operation of the luminance CBF decoding unit 101 according to the present embodiment will be described in detail with reference to FIG. 2. FIG. 2 is a flowchart showing a flow of operations of the luminance CBF decoding unit 101 according to the present disclosure.

First, the luminance CBF decoding unit 101 obtains a target bit stream BS. Moreover, the control unit 102 obtains information POS indicating where the luminance CBF flag to be a decoding target is as a size of a coded block and a transform coefficient, and outputs it to the luminance CBF decoding unit 101.

Next, the luminance CBF decoding unit 101, from information obtained from the control unit 102, determines (i) whether or not a size of a transform block showing the luminance CBF flag of the decoding target is the same as that of a coded block, or (ii) whether or not, for example, the size of the transform block is the same as the maximum size of the transform block (S201). It should be noted that information specifying the maximum size of the transform block is, for example, included in a bit stream.

When at least one of the above described (i) and (ii) is satisfied (YES in S201), ctxIdxInc which is a number for prescribing probability information used for arithmetic decoding is set to 1 (S203). Meanwhile, when none of the above described (i) and (ii) are satisfied (NO in S201), ctxIdxInc which is a number for prescribing probability information for use in arithmetic decoding is set to 0 (S202). It should be noted that the value set to ctxIdxInc is not limited to the examples of Steps S202 and S203. In other words, it is acceptable as long as a different value is set for each of Step S202 and Step S203. Still, a common value needs to be set to the coding side and the decoding side.

Next, a probability value is obtained which corresponds to ctxIdx obtained by adding ctxIdxInc which is a number for prescribing the probability information obtained in Steps S202 and S203, and an offset value (refer to FIGS. 5A to 5D to be described) which is determined for each of the predetermined slices, and arithmetic decoding processing is performed on the target luminance CBF flag (S204). With this, the luminance CBF flag is obtained.

Next, the luminance CBF flag obtained in Step S204 is output with respect to the control unit 102 and is used for control of the switch 103. In the case where the luminance CBF flag indicates "no coefficient" (for example 0), the switch 103 is connected to a terminal B. In other words, since there is no transform coefficient in the transform block, there is no residual signal to be added with respect to the image prediction signal PRED. Therefore, the image prediction signal PRED is output as a decoding image signal OUT.

Meanwhile, in the case where the luminance CBF flag indicates "coefficient exists" (for example 1), the switch 103 is connected to a terminal A. In this case, the residual coefficient signal included in the bit stream BS is decoded by the residual coefficient decoding unit 104, and the residual signal obtained through inverse transform and inverse quantization by the residual signal reconstruction unit 105, and the image prediction signal PRED are added by the addition unit 106, and the decoding image signal OUT is output. With this, the decoding image signal OUT can be correctly output from the bit stream BS with the use of the luminance CBF flag.

In other words, the luminance CBF decoding unit 101 and the control unit 102 shown in FIG. 1, for example, correspond to the arithmetic decoding unit according to the present embodiment. Moreover, the switch 103, the residual coefficient decoding unit 104, and the residual signal reconstruction unit 105 shown in FIG. 1 correspond to the reconstruction unit according to the present embodiment. It should be noted that they are not limited to the above described correspondence relationships.

Figure 3:
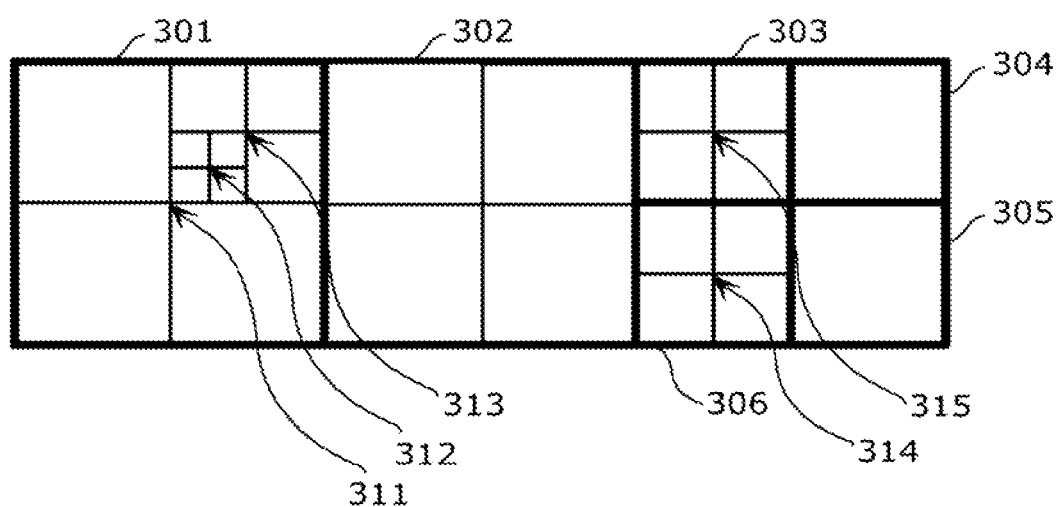
FIG. 3 is a schematic view for explaining details of the luminance CBF decoding unit 101 according to Embodiment 1.

FIG. 3 is a schematic view for explaining the condition shown in Step S201 of FIG. 2. Blocks 301 to 306 illustrated in thick frames denote coded blocks. Moreover, blocks generated through further division of blocks 301 and 302 denote transform blocks.

The size of the transform block is determined to be as large as or smaller than the size of the coded block. It should be noted that in this description, the case will be described where the size of blocks 301 and 302 are the maximum size of the coded block (64×64 pixels) and the maximum size of the transform block is determined to be a block size smaller by one hierarchical layer (32×32 pixels). Moreover, the maximum size of the transform size is varied according to information illustrated in slice header information.

It should be noted that since the present disclosure, regardless of the size of the transform block, is characterized by switching probability tables according to a constant condition (Step S201) and not depending on the results of the surrounding blocks, the present disclosure can realize effects of the present disclosure (reduction in an amount of memory) even if there is a change in the maximum size of the transform block.

Here, the case where the block 301 is determined as a coded block will be described.

First, in the case where a small block of the first hierarchical layer each obtained through the division of the block 301 into four blocks is a transform block, the luminance CBF flag 311 corresponding to the small block of the first hierarchical layer is decoded. In the case where the luminance CBF flag 311 indicates no coefficient, the transform coefficient is not included in the small block of the first hierarchical layer. Therefore, the luminance CBF flags 312 and 313 corresponding to the blocks smaller than this are not decoded. It should be noted that in the case where the luminance CBF flag 311 is decoded, the small block of the first hierarchical layer becomes the maximum size of the transform block (YES in S201 of FIG. 2). Therefore, ctxIdxInc=1 is used as a number showing a probability table for use in arithmetic decoding of the luminance CBF flag (S203 in FIG. 2).

Meanwhile, in the case where a small block of the second hierarchical layer (16×16 pixels) each obtained through the division of the block into four blocks is a transform block, the luminance CBF flag 312 corresponding to the small block of the second hierarchical layer is decoded. Moreover, in the case where a small block of the third hierarchical layer (8×8 pixels) each obtained through a further division of the block into four blocks is a transform block, the luminance CBF flag 313 corresponding to the small block of the third hierarchical layer is decoded. In these cases, ctxIdxInc=0 is used as a number showing a probability table for use in arithmetic decoding of the luminance CBF flag (S202 in FIG. 2).

In the case where the luminance CBF flag (illustration omitted) corresponding to the small block of the first hierarchical layer of the block 302 is decoded, ctxIdxInc=1 is used as a number showing the probability table, while in the case where the luminance CBF flag (illustration is omitted) corresponding to the small block of the second and following hierarchies is decoded, ctxIdxInc=0 is used as a number showing the probability table. Furthermore, also with respect to blocks 303 to 306, after it is determined whether or not the size of the transform block is identical to the size of the coded block or the maximum size of the transform block, a number ctxIdxInc showing a probability table is determined according to a determination result.

As described above, by switching between two kinds in which ctxIdxInc is determined as "0" or "1" based on a comparison between the size of the transform block and the size of the coded block, the number of probability tables is reduced from the conventional 4 to 2 (per slice). Since there is no need of reference to the luminance CBF flag of the surrounding block for determining ctxIdxInc of the luminance CBF flag of the decoding target, a voluminous amount of memory including line buffer does not have to be prepared. As a result, the luminance CBF flag can be correctly decoded.

Moreover, by switching the probability table of the luminance CBF flag between two stages based on whether or not the size of the transform block is maximum, a decrease in coding efficiency caused by a reduction in the number of probability tables can be limited. This is because the existence or absence of a transform coefficient often depends on the block size of the transform block. More specifically, this takes advantage of a fact that a possibility is higher that all coefficients become zero if the transform size is smaller.

Figure 4:
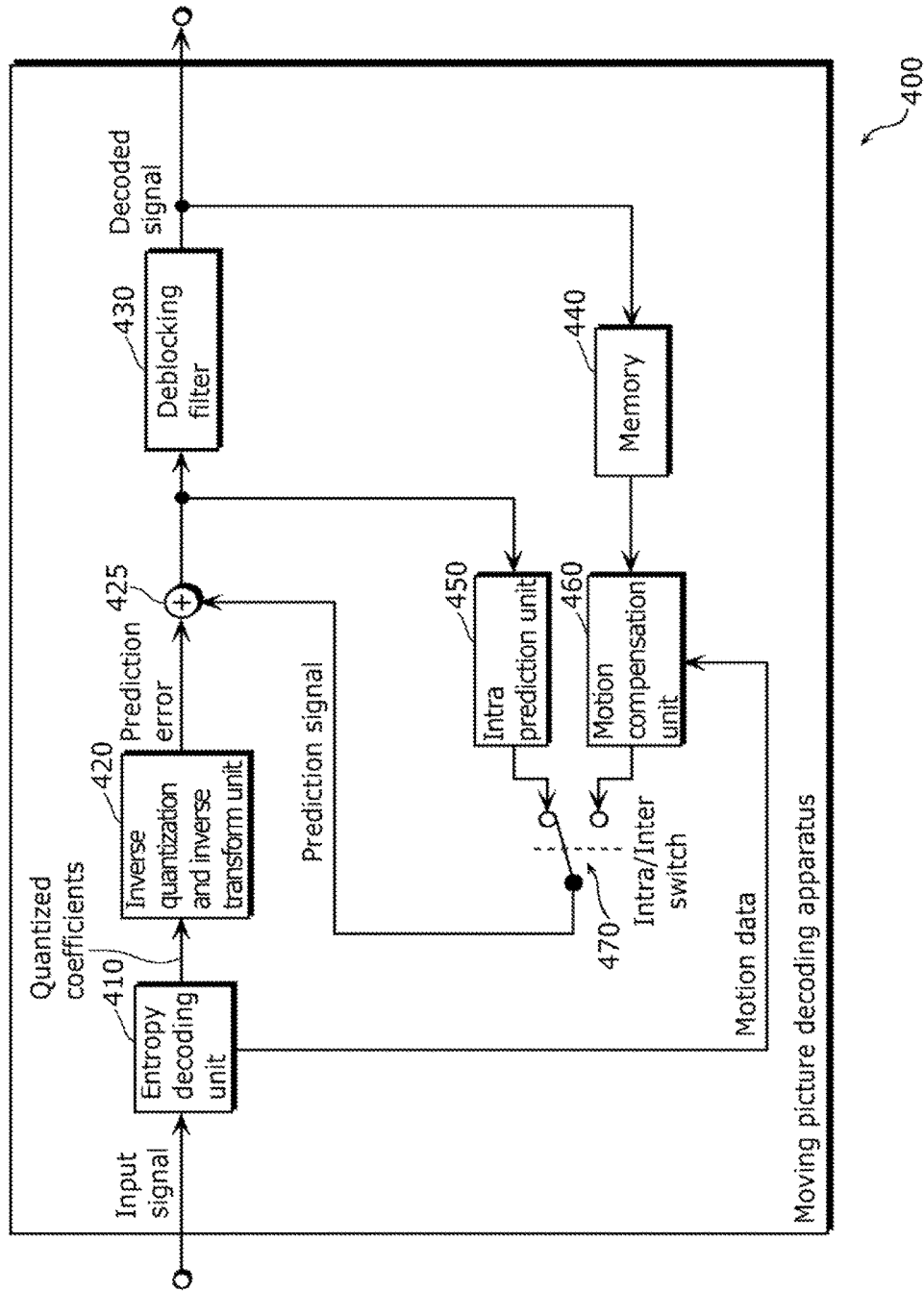
FIG. 4 is a block diagram showing an example of a configuration of a moving image decoding apparatus according to Embodiment 1.

It should be noted that an arithmetic decoding unit according to Embodiment 1 of the present disclosure (a decoding apparatus 100) is included in a moving picture decoding apparatus which decodes coded image data which are compressed and coded. FIG. 4 is a block diagram showing an example of a configuration of a moving picture decoding apparatus 400 according to Embodiment 1 of the present disclosure.

The moving picture decoding apparatus 400 decodes coded image data which are compressed and coded. For example, coded image data are input into the image decoding apparatus 400 as a decoding target signal for each of the blocks. The image decoding apparatus 400 reconstructs image data by performing variable length decoding, inverse quantization, and inverse transformation on the input decoding target signal.

As shown in FIG. 4, the moving picture decoding apparatus 400 includes an entropy decoding unit 410, an inverse quantization and inverse transform unit 420, an adder 425, a deblocking filter 430, a memory 440, an intra prediction unit 450, a motion compensation unit 460, and an intra/inter switch 470.

The entropy decoding unit 410 reconstructs quantized coefficients by performing variable length decoding on an input signal (input stream). It should be noted here that the input signal (input stream) is a decoding target signal and corresponds to data for each of the blocks of coded image data. Moreover, the entropy decoding unit 410 obtains motion data from the input signal, and outputs the obtained motion data to the motion compensation unit 460.

The inverse quantization and inverse transform unit 420 reconstructs the transform coefficients by performing inverse quantization on the quantized coefficients reconstructed by the entropy decoding unit 410. Then, the inverse quantization and inverse transform unit 420 reconstructs a prediction error by performing inverse transform on the reconstructed transform coefficients.

The adder 425 adds the prediction error reconstructed by the inverse quantization and inverse transform unit 420 and a prediction signal obtained from the intra/inter switch 470 to generate a decoded image.

The deblocking filter 430 performs deblocking filtering on the decoded image generated by the adder 425. The decoded image processed by the deblocking filter is output as a decoded signal.

The memory 440 is a memory for storing reference images for use in motion compensation. More specifically, the memory 440 stores decoded images in which a deblocking filter process is performed by the deblocking filter 430.

The intra prediction unit 450 performs intra prediction to generate a prediction signal (an intra prediction signal). More specifically, the intra prediction unit 450 performs intra prediction with reference to images surrounding the decoding target block (input signal) in the decoded image generated by the adder 425 to generate an intra prediction signal.

The motion compensation unit 460 performs motion compensation based on motion data output from the entropy decoding unit 410 to generate a prediction signal (an inter prediction signal).

The intra/inter switch 470 selects any one of an intra prediction signal and an inter prediction signal, and outputs the selected signal as the prediction signal to the adder 425.

With the above structure, the moving picture decoding apparatus 400 according to Embodiment 2 of the present disclosure decodes the compression-coded image data.

It should be noted that in the moving picture decoding apparatus 400, the decoding unit of the luminance CBF flag according to Embodiment 1 of the present disclosure is included by the entropy decoding unit 410, the inverse quantization and inverse transform unit 420, and the adder 425. More specifically, for example, the luminance CBF decoding unit 101, the control unit 102, the switch 103, the residual coefficient decoding unit 104 in FIG. 1 are included in the entropy decoding unit 410, the residual signal reconstruction unit 105 in FIG. 1 is included in the inverse quantization and inverse transform unit 420 in FIG. 4, and the addition unit 106 in FIG. 1 is included in the adder 425 in FIG. 4. It should be noted that they are not limited to the above described correspondence relationships.

As described above, the moving picture decoding apparatus and the moving picture decoding method according to Embodiment 1 of the present disclosure make it possible to appropriately reconstruct a bit stream in which the need of a memory for decoding the luminance CBF is decreased by performing arithmetic decoding on the luminance CBF flag of the decoding target without depending on the value of the luminance CBF of the surrounding block.

FIGS. 5A, 5B, 5C and 5D each show an example of Tables 1000 to 1003 for use in arithmetic decoding according to the present embodiment. It should be noted that Tables 1000 to 1003 are tables which correspond to FIGS. 28A to 28D, respectively. As shown in FIGS. 5A to 5D, in the present embodiment, two probability tables per slice are switched. Moreover, the result of the luminance CBF flag for each of the surrounding blocks is not used for the switching of the probability table. This will be further described with reference to FIG. 6.

FIG. 6 is sentences for explaining a method for obtaining ctxIdxInc which is a number for deriving the probability with respect to the luminance CBF flag according to the present embodiment. As illustrated here, the switch of the two numbers depends on the block size of the transform size (transformDepth and MaxTrafoSize) but does not depend on the results of the surrounding blocks.

Embodiment 2

An outline of an arithmetic coding method according to the present embodiment will be described. It should be noted that detailed descriptions about portions similar to Embodiment 1 will be omitted and will be focused on the differences.

The arithmetic coding method according the present embodiment does not conventionally use the result of the luminance CBF flag in surrounding blocks for coding the luminance CBF flag, but is characterized by switching between two probability tables (per slice) according to the size of the transform block. With this, a memory size necessary for coding is significantly reduced.

An outline of the arithmetic coding method according to the present embodiment has been described. In the case where there is no specific explanation, it is shown that the same method as the conventional arithmetic coding method may be taken.

A moving picture coding apparatus according to Embodiment 2 codes a moving picture signal for each of the first processing units. More specifically, the moving picture coding apparatus includes a transform and quantization unit which transforms a moving picture signal (for example a residual signal) in a spatial domain into a frequency domain coefficient and quantizes the frequency domain coefficient for each of one or more second processing units included in the first processing unit, and an arithmetic coding unit which performs arithmetic coding on a luminance CBF flag indicating whether or not a quantized coefficient is included in the second processing unit processed by the transform and quantization unit.

Then, the arithmetic coding unit determines a probability table for use in arithmetic coding according to whether or not a size of the first processing unit is identical to a size of the second processing unit and whether or not the second processing unit has a predetermined maximum size (a context is switched). The arithmetic coding unit may further determine a probability table for use in arithmetic coding according to type to which the first processing unit belongs.

Figure 7:
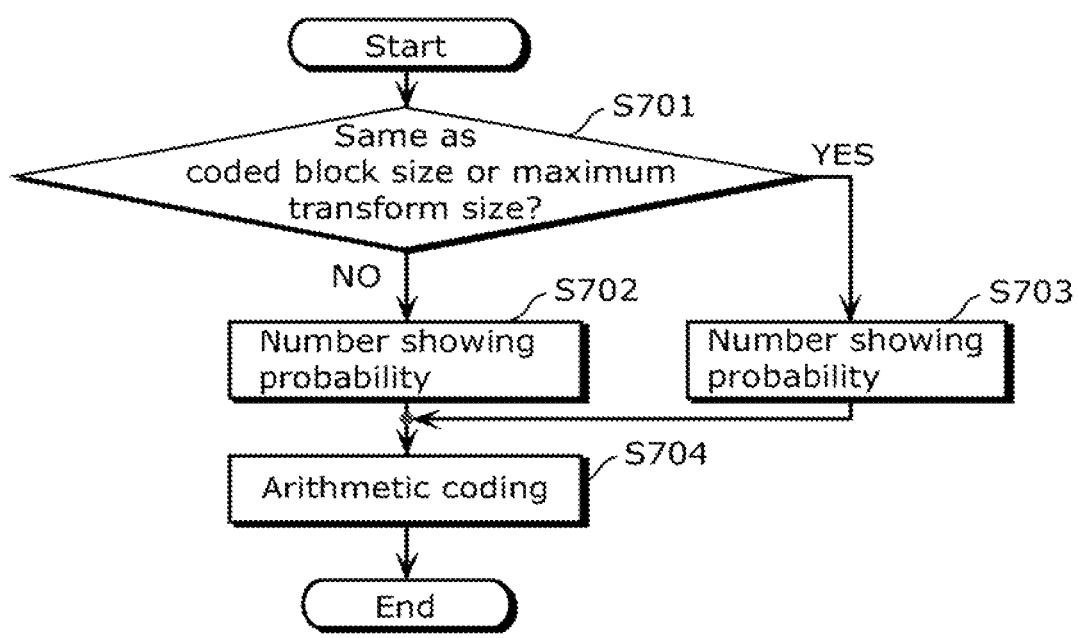
FIG. 7 is a flowchart showing a flow of operations of a luminance CBF flag coding unit according to Embodiment 2.

Next, a flow of processes by a luminance CBF flag coding unit performing the luminance CBF flag coding method according to the present embodiment will be described. FIG. 7 is a flowchart showing an example of a flow of operations of a luminance CBF flag coding unit according to Embodiment 2 of the present disclosure.

The luminance CBF flag coding unit, from information obtained from the control unit, determines (i) whether or not a size of a transform block indicating the luminance CBF flag of the coding target is the same as that of a coded block, or (ii) whether or not a size of a transform block, for example, is the same as the maximum size of the transform block (S701). It should be noted that information specifying the maximum size of the transform block is, for example, included in a bit stream.

When at least one of (i) and (ii) is satisfied (YES in S701), ctxIdxInc which is a number for prescribing probability information for arithmetic coding is set to 1 (S703). Meanwhile, when none of the above described (i) and (ii) are satisfied (NO in S701), ctxIdxInc which is a number for prescribing probability information used for arithmetic coding is set to 0 (S702).

Next, a probability value is obtained which corresponds to ctxIdx obtained by adding ctxIdxInc which is a number for prescribing the probability information obtained in Steps S702 and S703 and an offset value (refer to FIGS. 5A to 5D) which is determined in advance for each of the slices, and arithmetic coding processing is performed on the target luminance CBF flag (S704). With this, the luminance CBF flag is coded.

By coding in this way, a coding apparatus of the luminance CBF flag with a limited required amount of memory can be realized.

Figure 8:
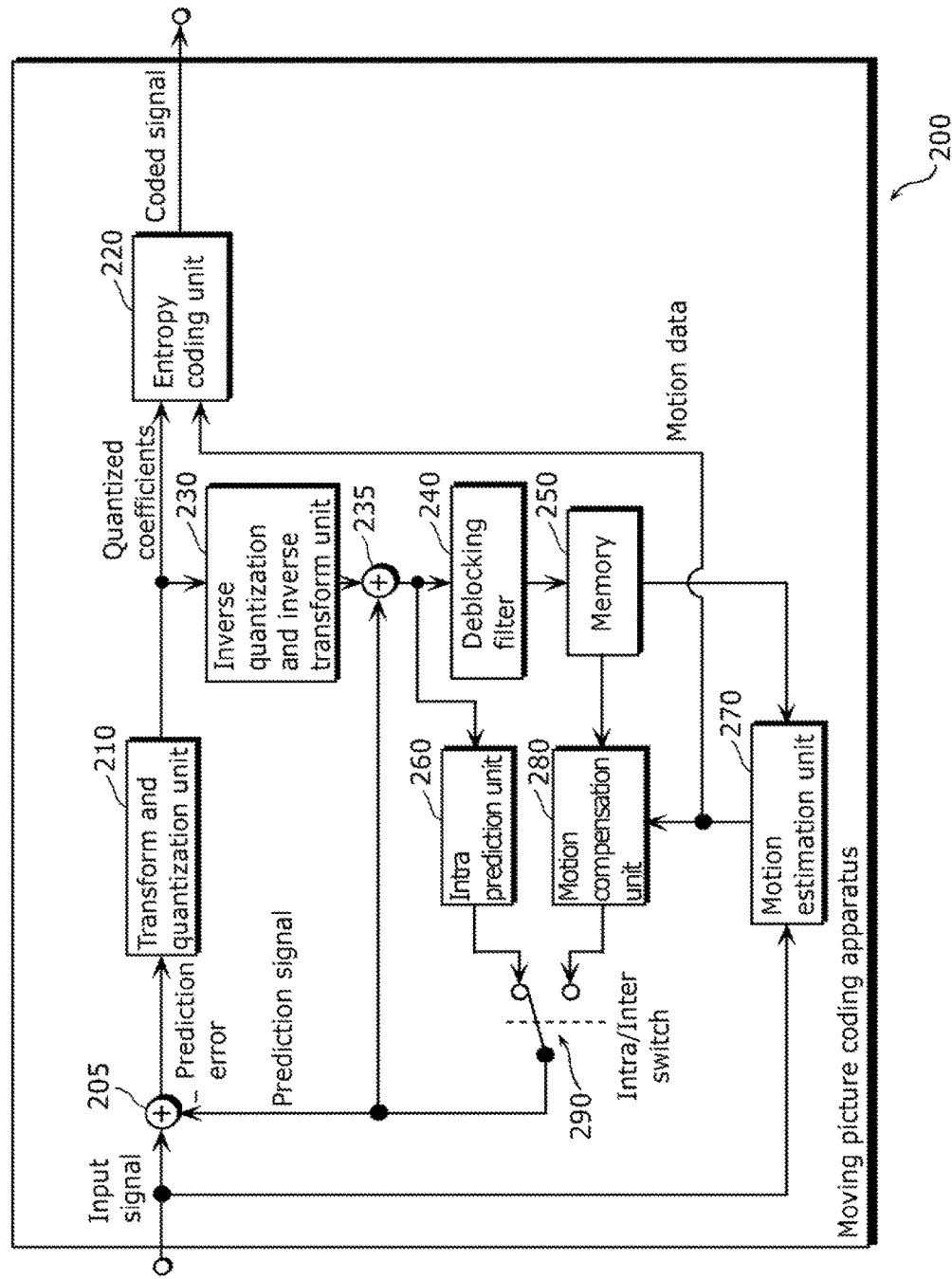
FIG. 8 is a block diagram showing an example of a configuration of an image coding apparatus according to Embodiment 2.

It should be noted that a luminance CBF flag coding unit according to Embodiment 2 of the present disclosure is included in an image coding apparatus which performs compression coding on image data. FIG. 8 is a block diagram showing an example of a configuration of an image coding apparatus 200 according to Embodiment 2 of the present disclosure.

The image coding apparatus 200 performs compression coding on image data. For example, image data are input into the image coding apparatus 200 as an input signal for each of the blocks. The image coding apparatus 200 performs transform, quantization, and variable length coding on the input signal to generate a coded signal.

Figure 10:
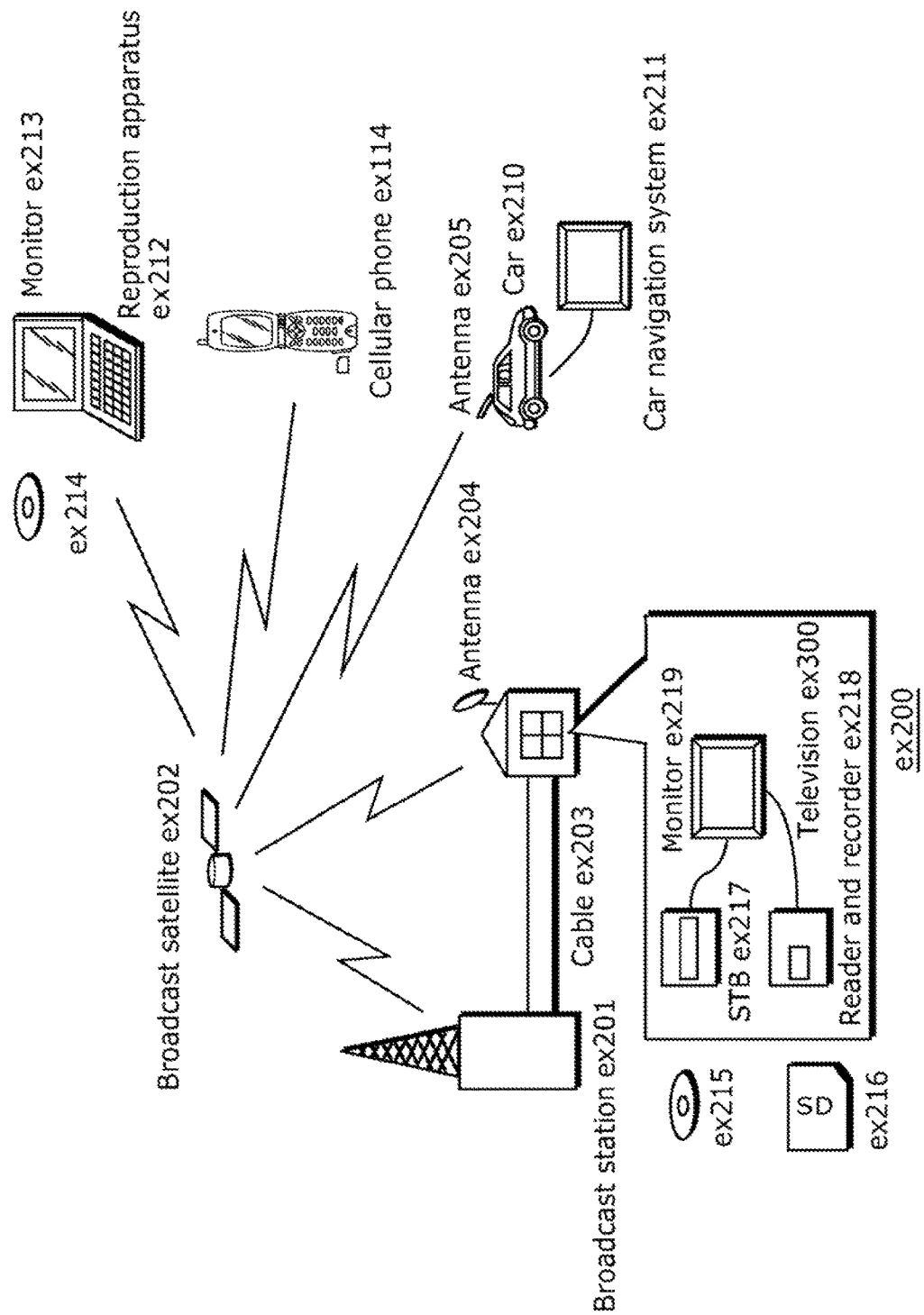
FIG. 10 is are overall configuration of digital broadcasting system.

As shown in FIG. 10, the image coding apparatus 200 includes a subtractor 205, a transform and quantization unit 210, an entropy coding unit 220, an inverse quantization and inverse transform unit 230, an adder 235, a deblocking filter 240, a memory 250, an intra prediction unit 260, a motion estimation unit 270, a motion compensation unit 280, and an intra/inter switch 290.

The subtractor 205 calculates a prediction error that is the difference between the input signal and the prediction signal.

The transform and quantization unit 210 transforms the prediction error in the spatial domain into transform coefficients in the frequency domain. For example, the transform and quantization unit 210 performs Discrete Cosine Transform (DCT) on the prediction error to generate transform coefficients. Furthermore, the transform and quantization unit 210 quantizes the transform coefficients to generate quantized coefficients.

Moreover, the transform and quantization unit 210 generates a luminance CBF flag indicating whether or not a coefficient (quantized coefficient) is present in the transform block. More specifically, the transform and quantization unit 210 sets "1" to the luminance CBF flag when a coefficient is present in the transform block and sets "0" to the luminance CBF flag when a coefficient is not present in the transform block.

The entropy coding unit 220 performs variable length coding on the quantized coefficient to generate a coded signal. In addition, the entropy coding unit 220 codes motion data (for example a motion vector) estimated by the motion estimation unit 270, adds the motion data to the coded signal, and outputs the coded signal.

The inverse quantization and inverse transform unit 230 reconstructs the transform coefficients by performing inverse quantization on the quantized coefficients. Furthermore, the inverse quantization and inverse transform unit 230 reconstructs a prediction error by performing inverse transform of the reconstructed transform coefficients. Here, the reconstructed prediction error has lost information through the quantization, and thus does not match the prediction error that is generated by the subtractor 205. In other words, the reconstructed prediction error includes a quantization error.

The adder 235 adds the reconstructed prediction error and the prediction signal to generate a local decoded image.

The deblocking filter 240 performs deblocking filtering on the generated local decoded image.

The memory 250 is a memory for storing reference images for use in motion compensation. More specifically, the memory 250 stores the local decoded images processed by the deblocking filter.

The intra prediction unit 260 performs intra prediction to generate a prediction signal (an intra prediction signal). More specifically, the intra prediction unit 260 performs intra prediction with reference to images surrounding the coding target block (input signal) in the local decoded image generated by the adder 235 to generate an intra prediction signal.

The motion estimation unit 270 estimates motion data (for example a motion vector) between the input signal and a reference image stored in the memory 250.

The motion compensation unit 280 performs motion compensation based on the estimated motion data to generate a prediction signal (an inter prediction signal).

The intra/inter switch 290 selects any one of an intra prediction signal and an inter prediction signal, and outputs the selected signal as the prediction signal to the subtractor 205 and the adder 235.

With this structure, the image coding apparatus 200 according to Embodiment 2 of the present disclosure compression codes the image data.

It should be noted that in the moving picture coding apparatus 200, the CBF flag coding unit is, for example, included in the entropy coding, unit 220. In other words, the CBF flag coding unit included in the entropy coding unit 220 performs arithmetic coding on the luminance CBF flag generated by the transform and quantization unit 210. It should be noted that it is not limited to the above described correspondence relationship.

Embodiment 3

The processing described in each of embodiments can be simply implemented in an independent computer system, by recording, in a recording medium, a program for implementing the configurations of the moving picture coding method (image coding method) and the moving picture decoding method described (image decoding method) in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method described (image decoding method) in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 9:
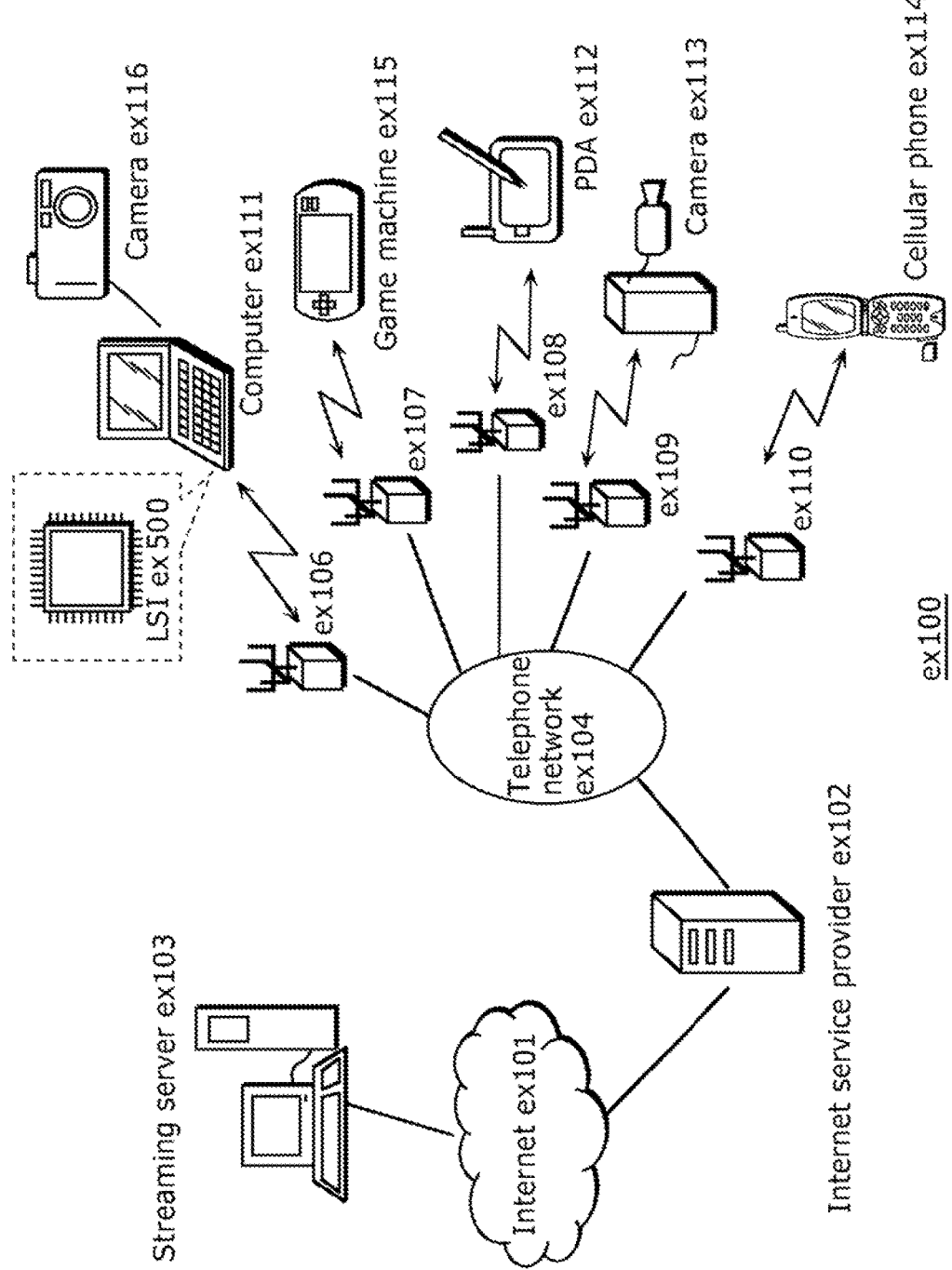
FIG. 9 is an overall configuration of a content providing system which implements content distribution services.

FIG. 9 illustrates an overall configuration of content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 9, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 10. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television.

Figure 11:
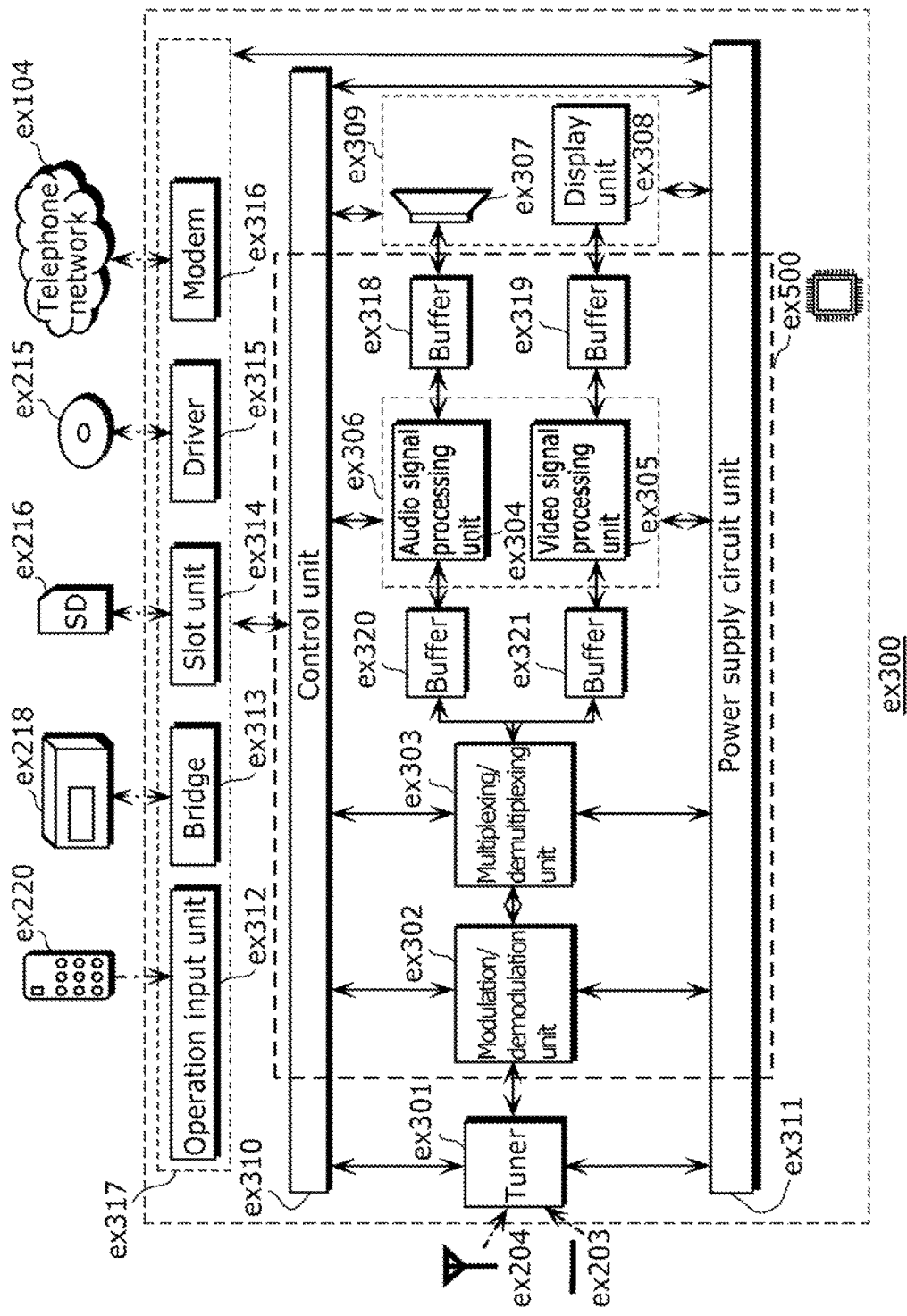
FIG. 11 is a block diagram showing an example of configuration of a television.

FIG. 11 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit, ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit, ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing, outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 12:
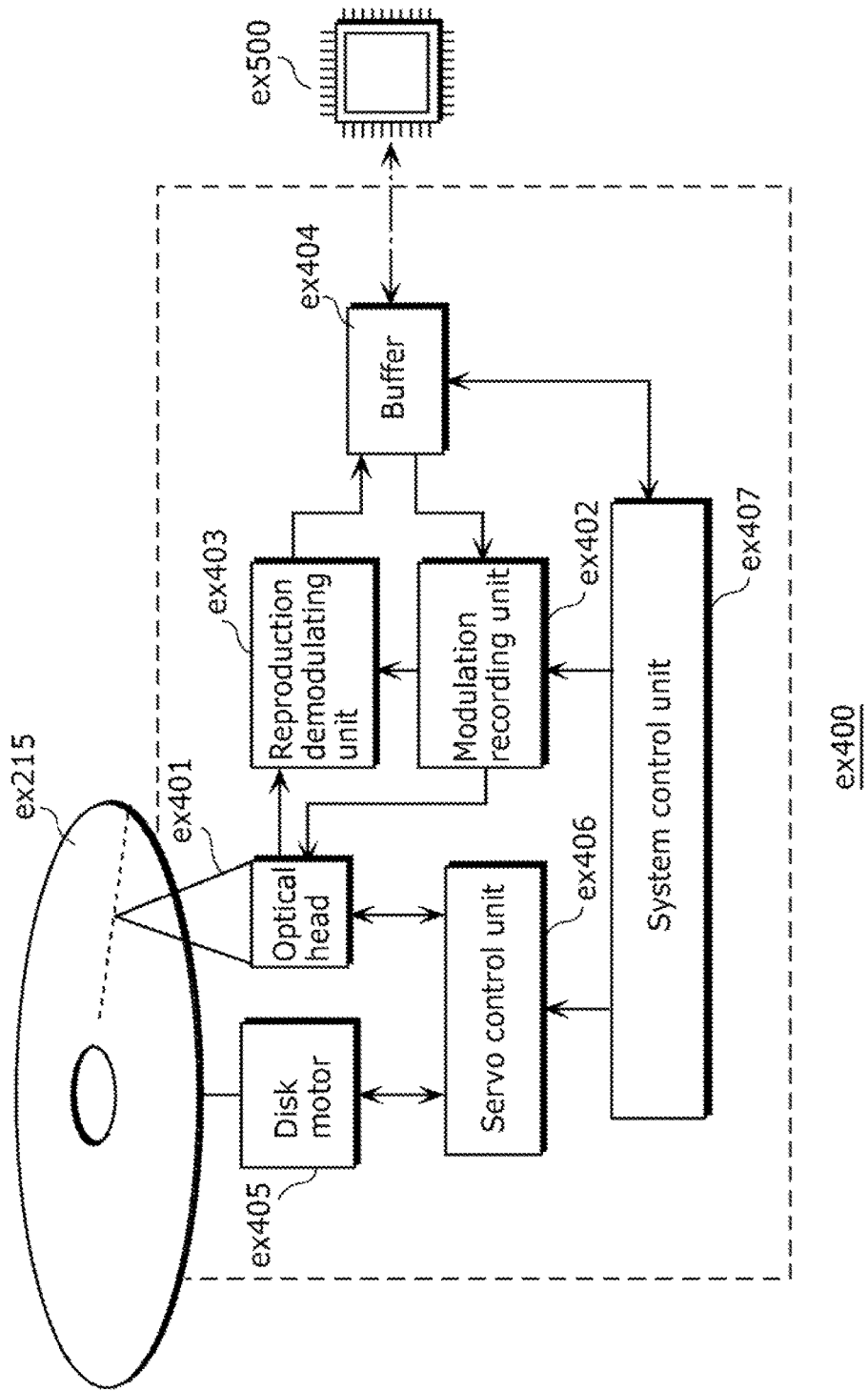
FIG. 12 is a block diagram illustrating an example of a configuration of an information reproducing/recording unit that reads and writes information from and on a recording medium that is an optical disk.

As an example, FIG. 12 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 13:
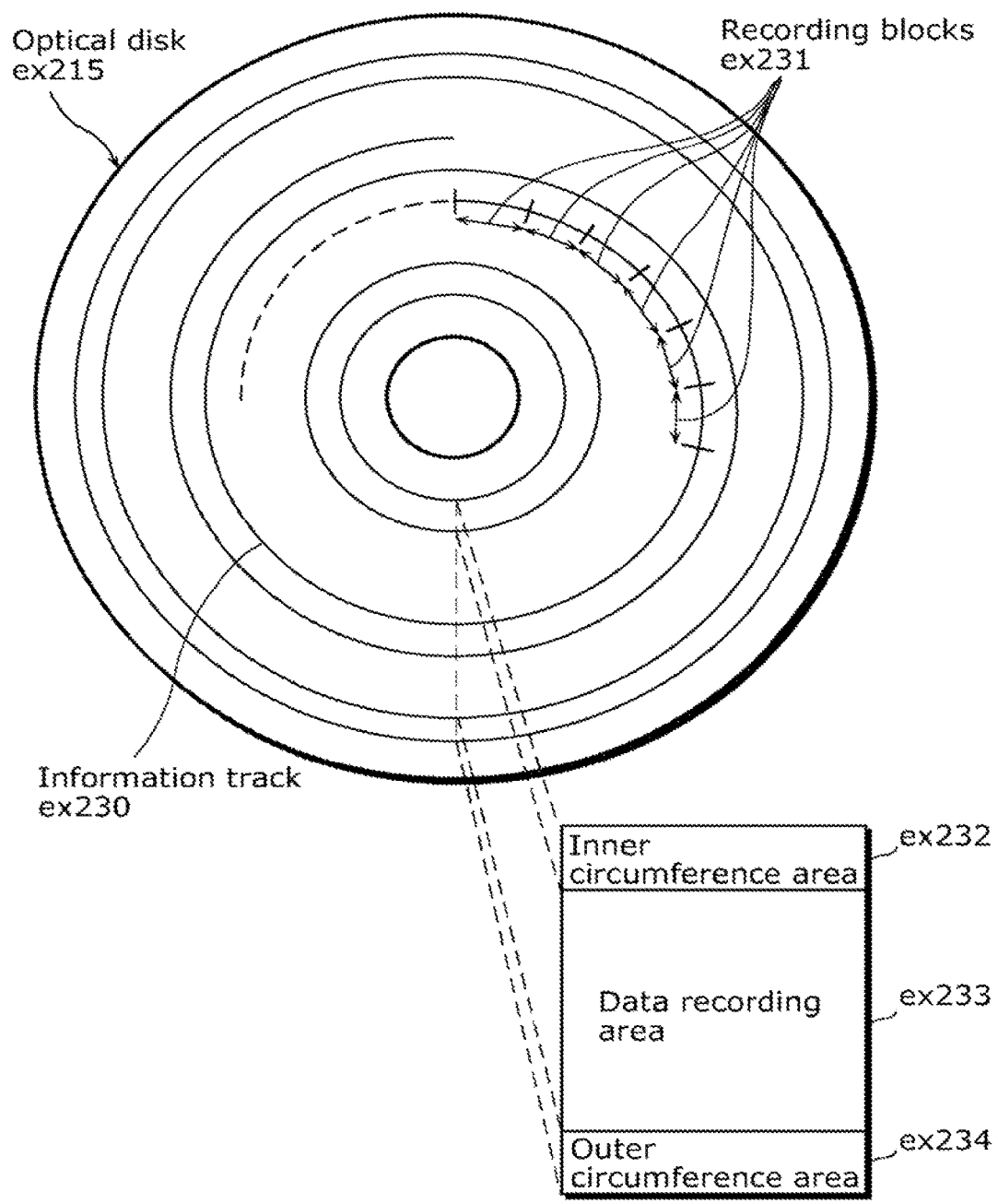
FIG. 13 is a diagram showing a configuration of a recording medium that is an optical disk.

FIG. 13 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex234 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 11. The same will be true for the configuration of the computer ex111, the cellular phone ex114, and others.

Figure 14A:
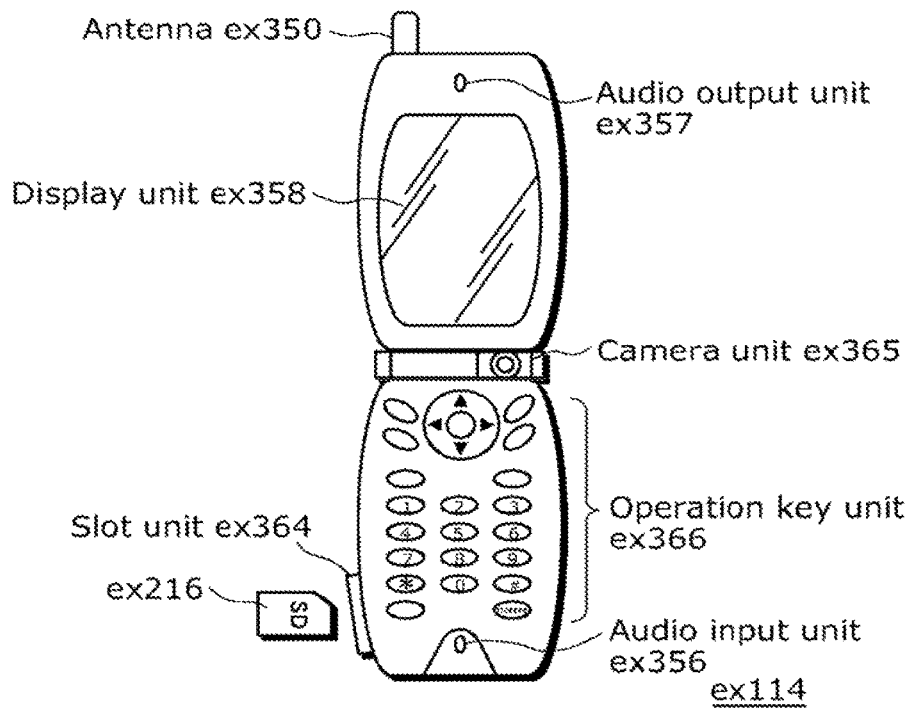
FIG. 14A is a diagram showing an example of a cellular phone.

FIG. 14A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 14B:
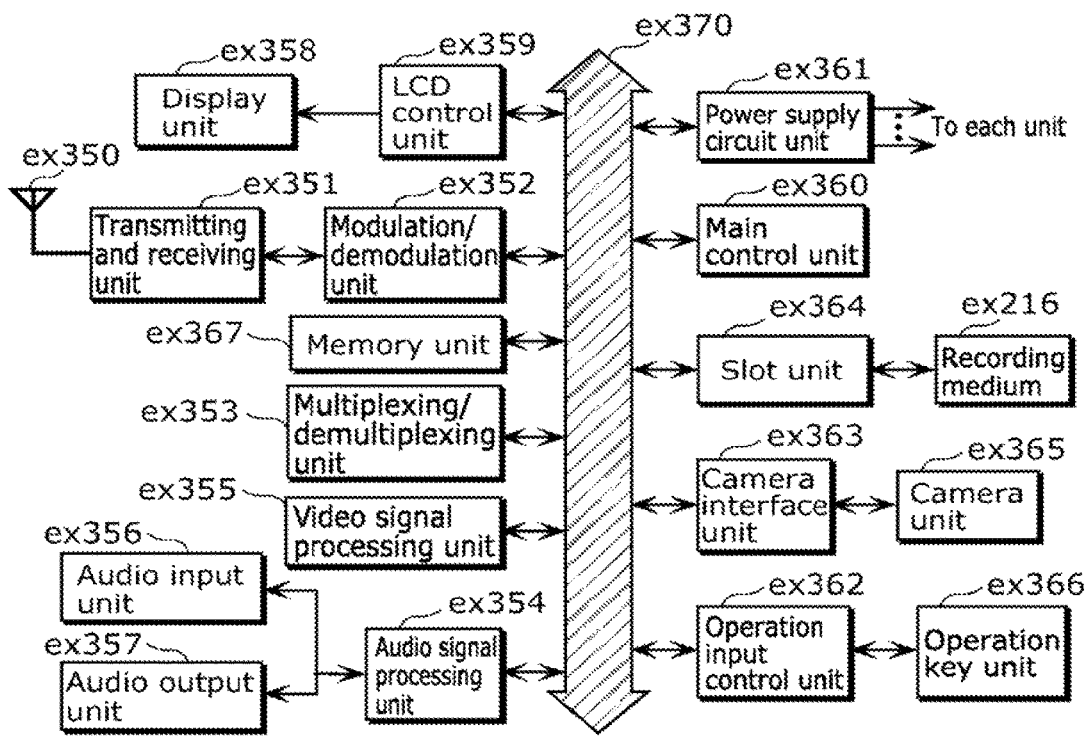
FIG. 14B is a block diagram showing an example of a configuration of a cellular phone.

Next, an example of a configuration of the cellular phone ex114 will be described with reference to FIG. 14B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM.

Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 15 illustrates a structure of the multiplexed data. As illustrated in FIG. 15, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 16:
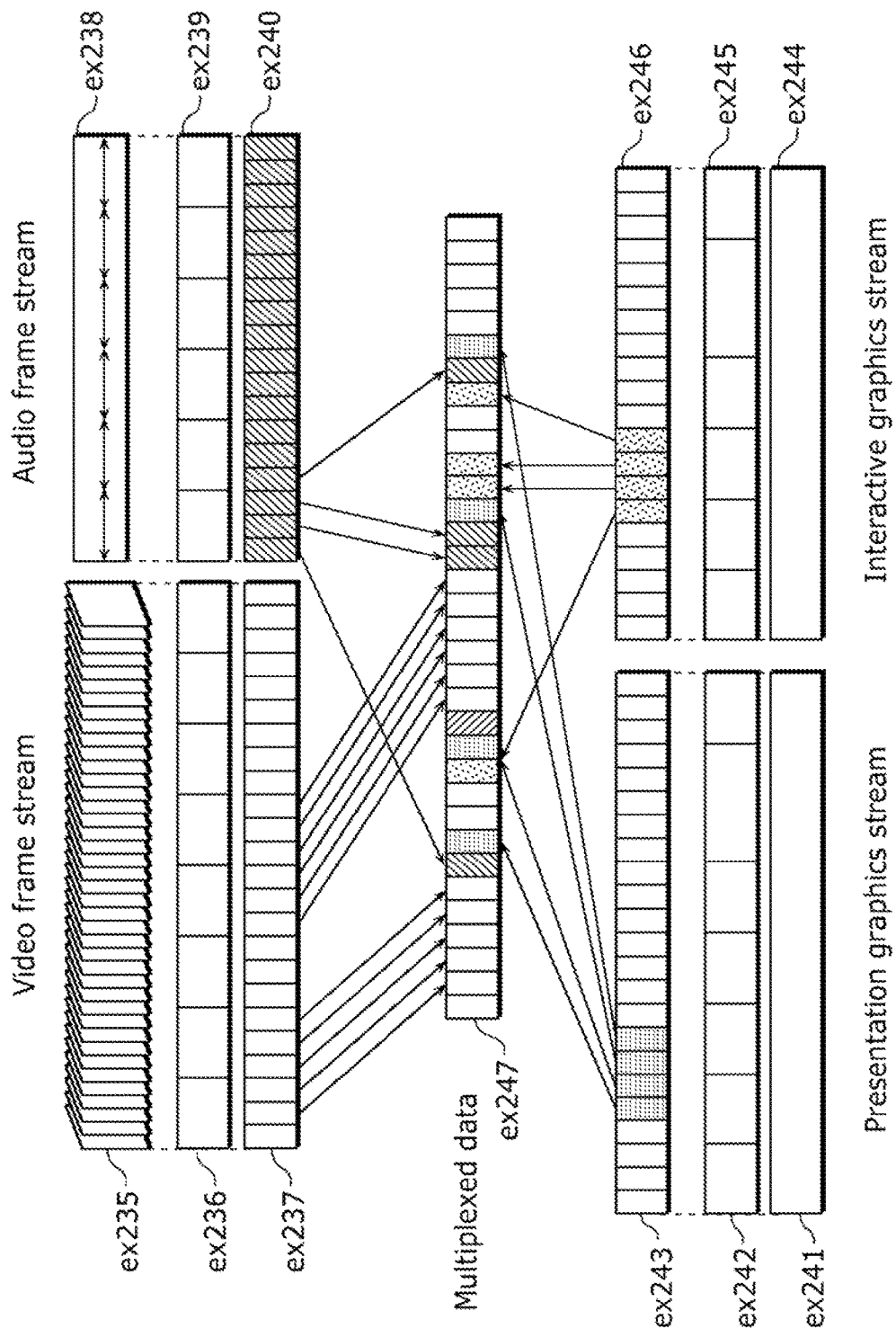
FIG. 16 is a diagram showing how to multiplex each stream in multiplex data.

FIG. 16 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 17:
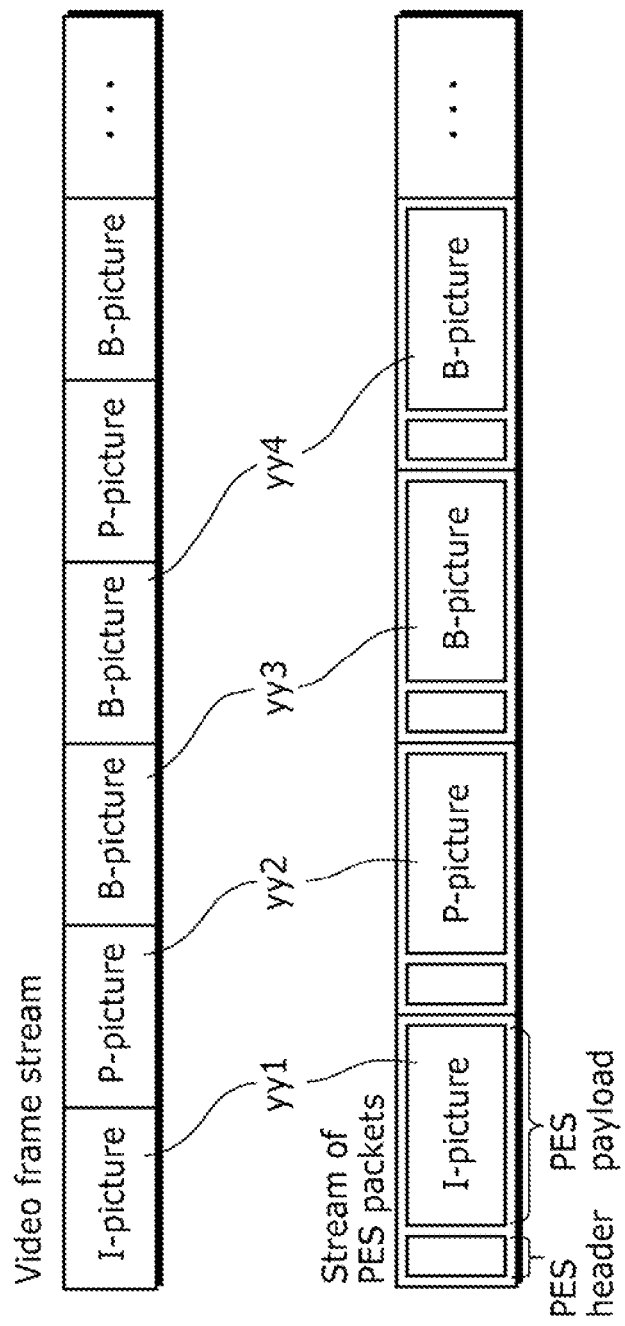
FIG. 17 is a diagram showing how a video stream is stored in a stream of PES packets in more detail.

FIG. 17 illustrates how a video stream is stored in a stream of PES packets in more detail. The first bar in FIG. 17 shows a video frame stream in a video stream. The second bar shows the stream of PES packets. As indicated by arrows denoted as yy1, yy2, yy3, and yy4 in FIG. 17, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 18:
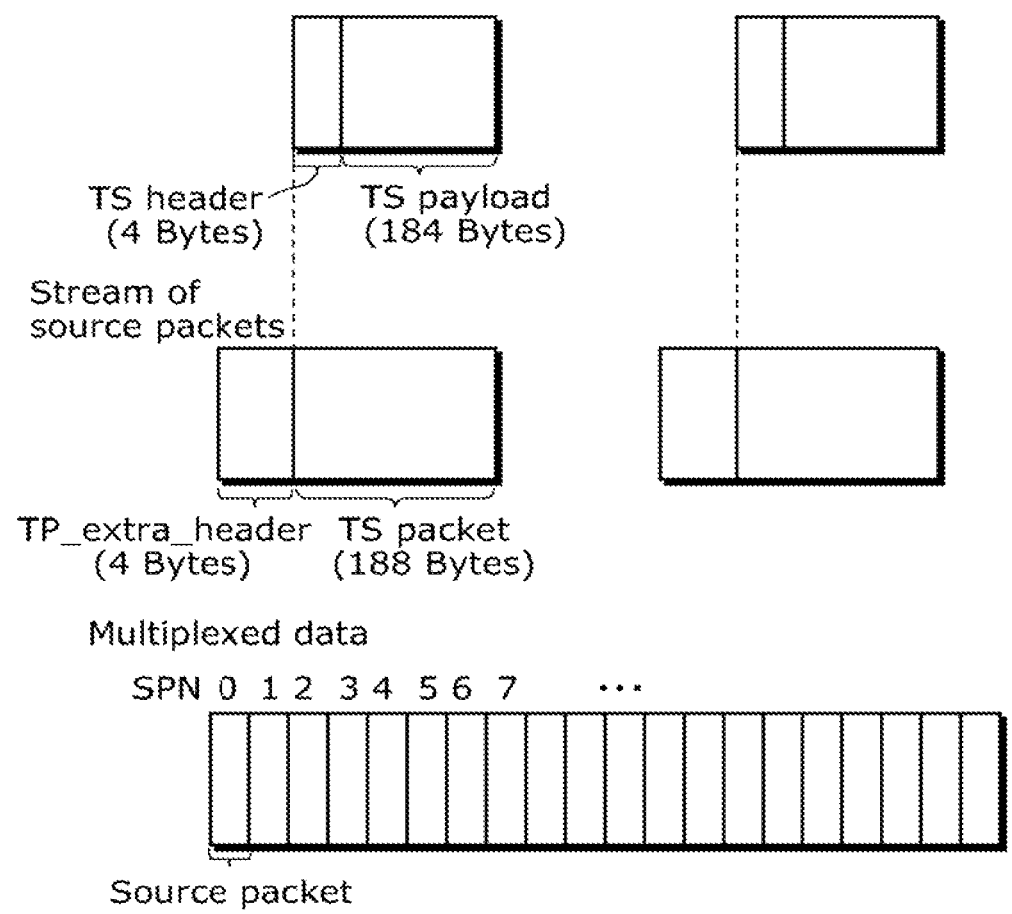
FIG. 18 is a diagram showing a structure of TS packets and source packets in the multiplexed data.

FIG. 18 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 18. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is time axis of ATSs, and an System Time Clock (STC) that is a time axis of PTSs and DTSs.

Figure 19:
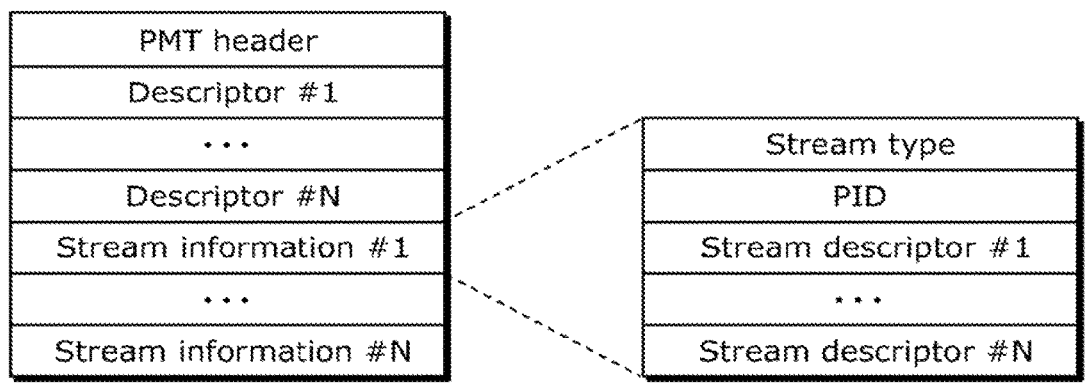
FIG. 19 is a diagram showing a data structure of a PMT.

FIG. 19 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 20:
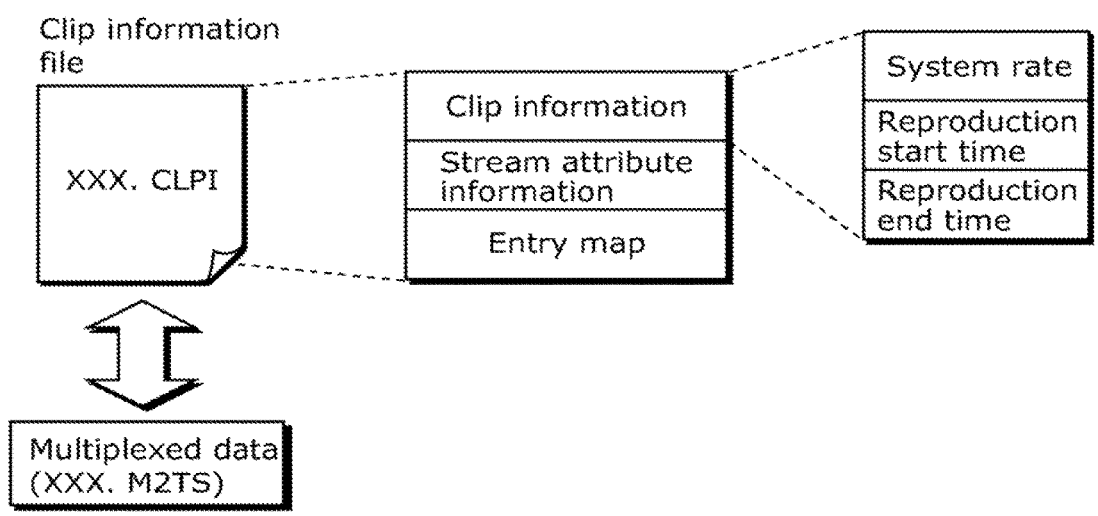
FIG. 20 is a diagram showing an internal structure of multiplexed data information.

Each of the multiplexed data information files is management information of the multiplexed data as shown in FIG. 20. The multiplexed data information files are in one to one correspondence with the multiplexed data, and each of the files includes multiplexed data information, stream attribute information, and an entry map.

As illustrated in FIG. 20, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 21:
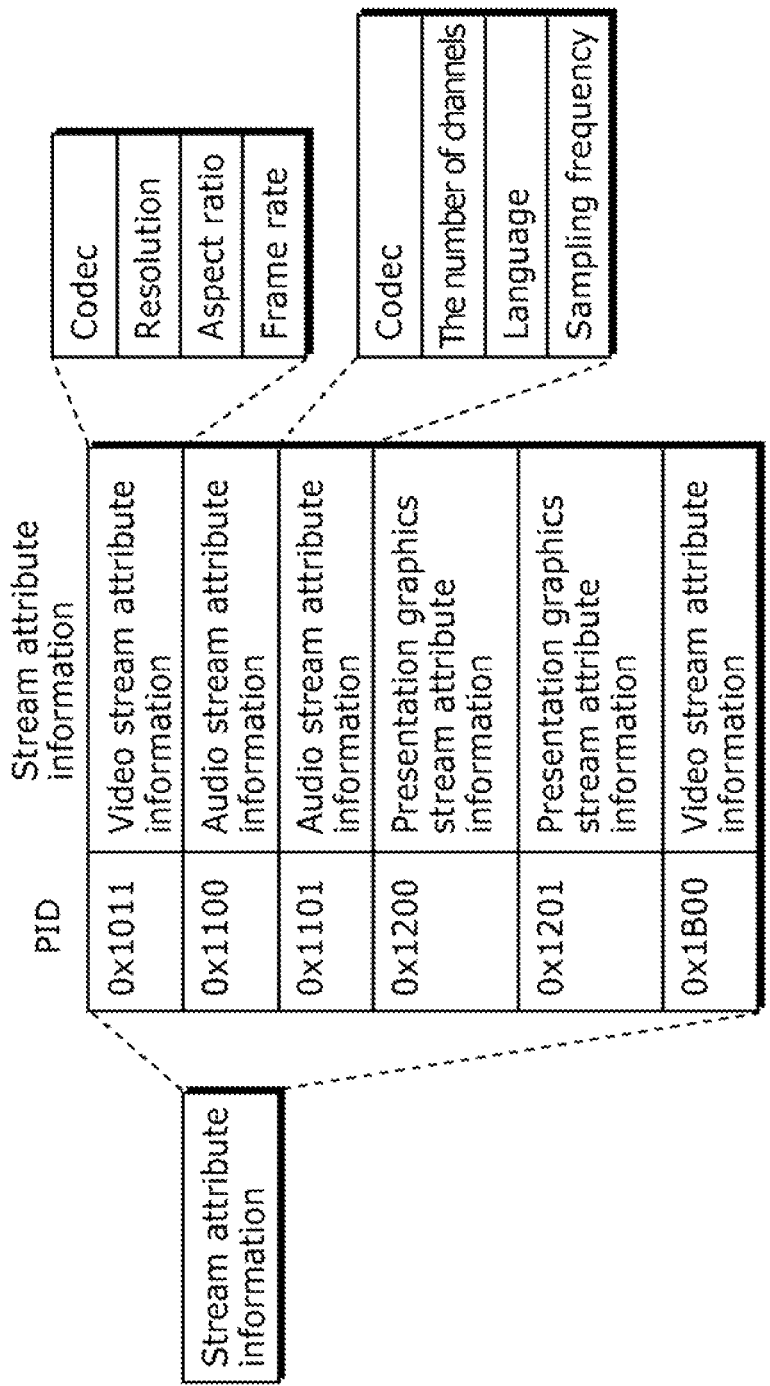
FIG. 21 is a diagram showing an internal stream attribute information.

As shown in FIG. 21, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 22:
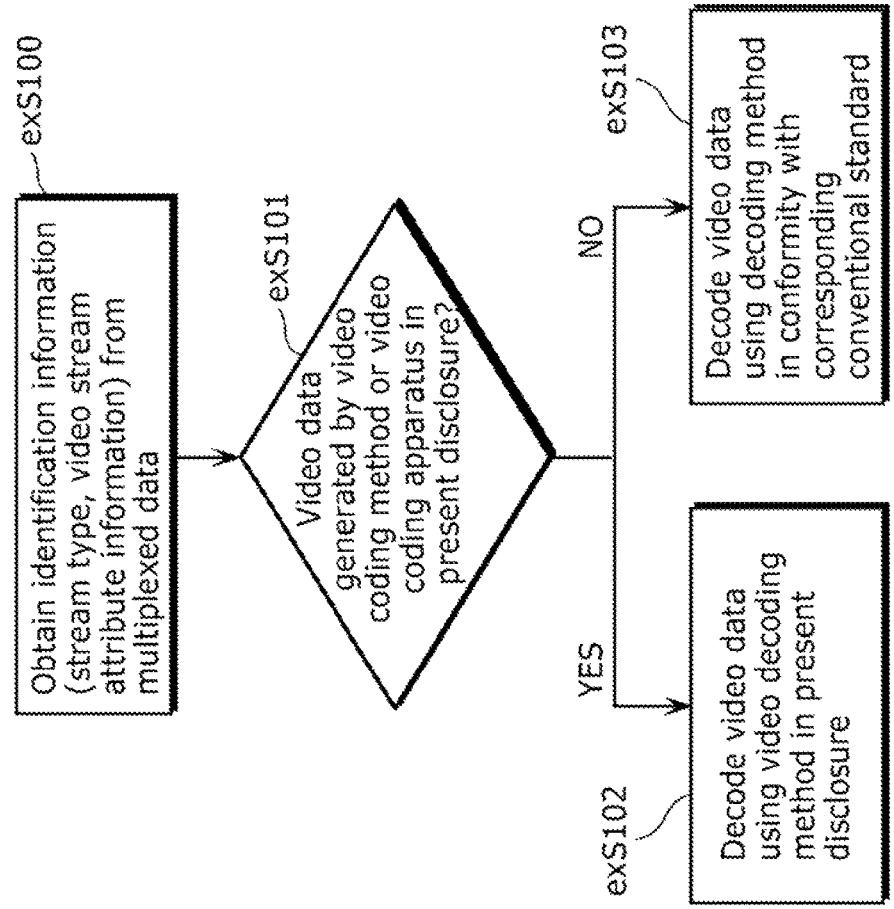
FIG. 22 is a diagram showing steps for identifying video data.

Furthermore, FIG. 22 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 23:
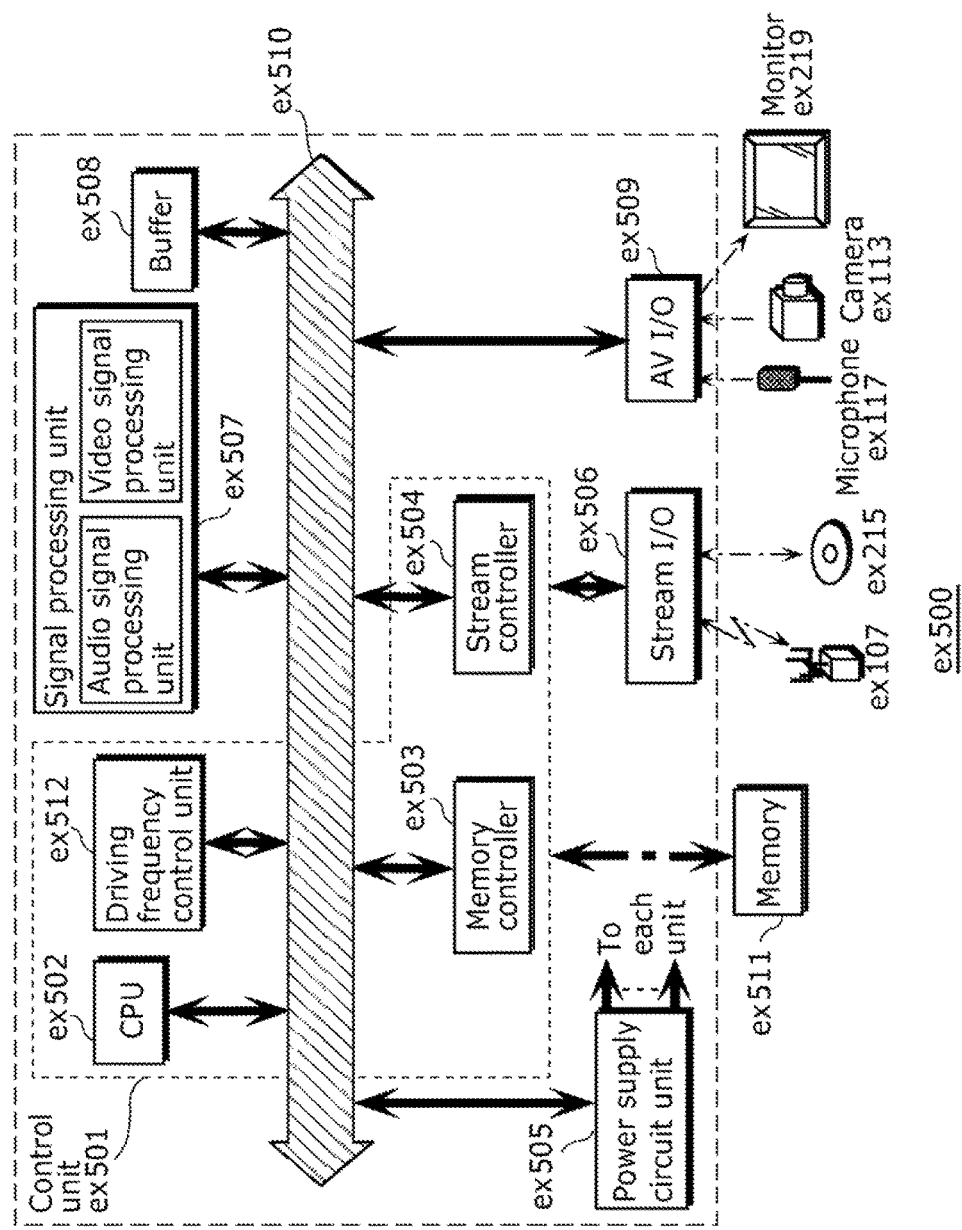
FIG. 23 is a block diagram showing an example of a configuration of an integrated circuit for implementing the moving picture coding method and the moving picture decoding method according to each of the embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 23 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be, used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 24:
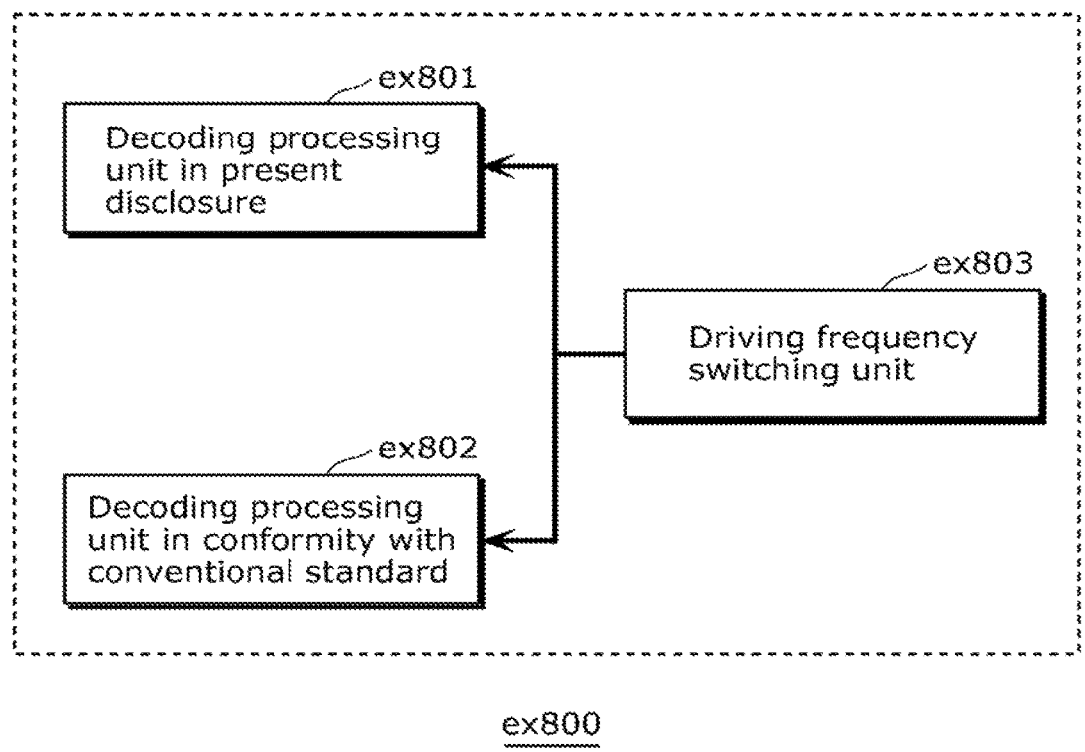
FIG. 24 is a diagram showing a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 24 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 23. Here, each of the decoding processing unit ex801 that executes the moving picture decoding method described in each of embodiments and the decoding processing unit ex802 that conforms to the conventional standard corresponds to the signal processing unit ex507 in FIG. 23. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 26. The driving frequency can be selected by storing the look-up table in the buffer ex508 and in an internal memory of an LSI, and with reference to the look-up table by the CPU ex502.

Figure 25:
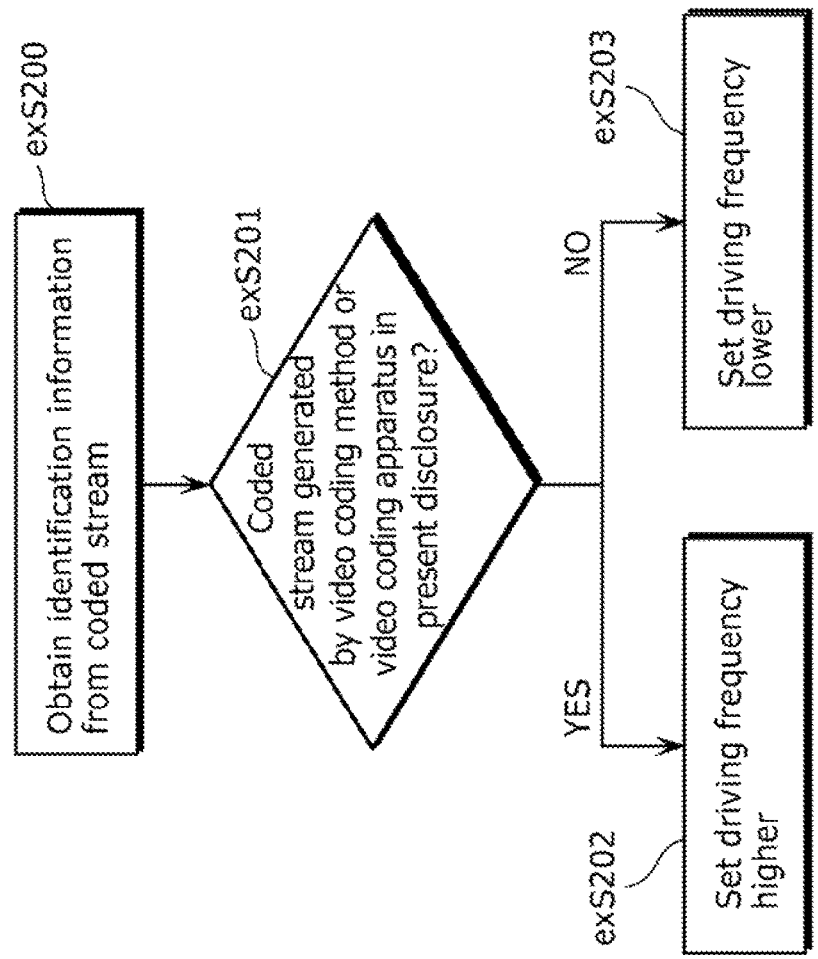
FIG. 25 is a diagram showing steps for identifying video date and switching between driving frequencies.

FIG. 25 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated, by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by witching between the driving frequencies in accordance with the standard to which the video data conforms. Furthermore, when the LSI ex500 or the apparatus including the LSI ex500 is driven using a battery the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 27A:
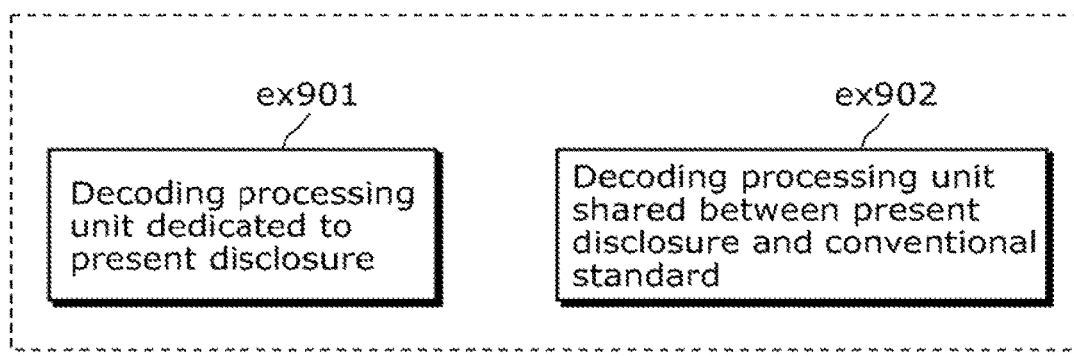
FIG. 27A is a diagram showing an example of configuration for sharing a module of a signal processing unit.
Figure 27B:
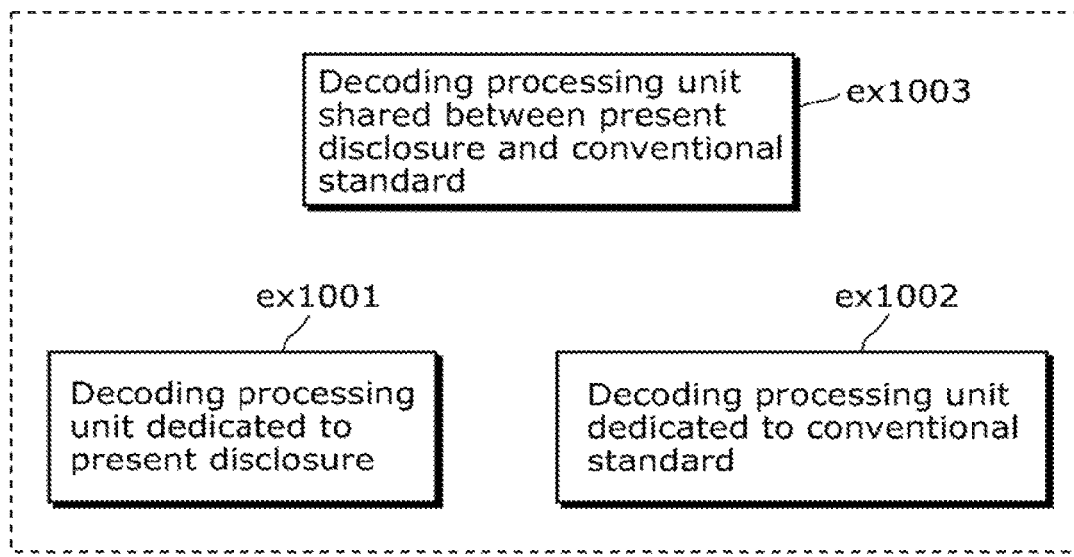
FIG. 27B is a diagram showing another example of a configuration for sharing a module of the signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 27A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC Furthermore, ex1000 in FIG. 27B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image decoding apparatus according to each of the embodiments is a program described below.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The moving picture coding method and moving picture decoding method according to one or more exemplary embodiments disclosed herein are applicable to various applications such as information display apparatuses and image capturing apparatuses which support high resolution. Examples of such apparatuses include a television set, a digital video recorder, a car navigation system, a cellular phone, a digital camera, and a digital video camera.

The invention claimed is:
1. A decoding device comprising:
at least one processor; and
non-transitory storage coupled to the at least one processor;
wherein the at least one processor is configured to perform the following:
  obtaining, from a coded signal, a luminance CBF flag indicating whether or not a quantized coefficient is included in a transform unit that is included in a coding unit of the image;
  judging whether or not a size of the coding unit is identical to a size of the transform unit;
  selecting a first probability table or a second probability table so that (i) the first probability table is selected when the size of the coding unit is identical to the size of the transform unit and (ii) the second probability table is selected when the size of the coding unit is not identical to the size of the transform unit regardless of the size of the transform unit, the first probability table corresponding to a context increment value 1 and the second probability table corresponding to a context increment value 0;
  performing arithmetic decoding on the luminance CBF flag using the selected one of the first probability table and the second probability table; and
  decoding a picture signal for the coding unit using the quantized coefficient of the transform unit when the luminance CBF flag indicates that the quantized coefficients is included in the transform unit,
wherein when the size of the transform unit is a first size which is smaller than the size of the coding unit, the selecting selects the second probability table,
wherein when the size of the transform unit is a second size which is smaller than the first size, the selecting selects the second probability table without depending on any surrounding blocks,
wherein when the size of the transform unit is smaller than a maximum size of the transform unit, the selecting selects the second probability table without depending on any surrounding blocks, the maximum size of the transform unit being indicated in the bitstream,
wherein switching is performed between decoding conforming to a first codec standard and decoding conforming to a second codec standard according to an identifier which is included in the bitstream and indicates the first codec standard or the second codec standard, the second codec standard being different from the first codec standard,
wherein each of the first probability table and the second probability table includes probability tables for types of a slice, and
wherein, in the performing of arithmetic coding, a probability table included in the selected one of the first probability table and the second probability table is used, the used probability table corresponding to a type of a slice to which the coding unit belongs.

* * * * *